US011642793B1

(12) United States Patent
George et al.

(10) Patent No.: US 11,642,793 B1
(45) Date of Patent: *May 9, 2023

(54) VARYING STRENGTH INTERFACE SYSTEM FOR ROBOTIC END-EFFECTOR

(71) Applicant: Amazon Technologies, Inc., Seattle, WA (US)

(72) Inventors: Margaret Jean Williams George, Cambridge, MA (US); Gregory Coleman, Somerville, MA (US); Manikantan Nambi, Malden, MA (US); Timothy G. Dietz, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 379 days.

This patent is subject to a terminal disclaimer.

(21) Appl. No.: 16/899,885

(22) Filed: Jun. 12, 2020

(51) Int. Cl.
*B25J 15/06* (2006.01)
(52) U.S. Cl.
CPC .................... *B25J 15/0616* (2013.01)
(58) Field of Classification Search
CPC .... B25J 15/0491; B25J 15/08; B25J 15/0683; B25J 15/0616; B25J 9/0015; B25J 9/123; B25J 9/1612
See application file for complete search history.

(56) References Cited

U.S. PATENT DOCUMENTS

| 3,147,872 | A | 9/1964 | Olson |
| 3,227,482 | A | 1/1966 | Harris |
| 3,734,325 | A | 5/1973 | Stone |
| 4,961,606 | A | 10/1990 | Nilsson |
| 5,344,202 | A | 9/1994 | Ramler et al. |
| 5,467,525 | A * | 11/1995 | Pine ..................... B25B 11/007 29/721 |
| 5,791,861 | A | 8/1998 | Seelig |
| 5,984,623 | A | 11/1999 | Smith et al. |
| 6,561,744 | B2 | 5/2003 | Liang |

(Continued)

FOREIGN PATENT DOCUMENTS

| DE | 1204140 B | 10/1965 |
| DE | 102010043036 A1 | 5/2012 |

(Continued)

OTHER PUBLICATIONS

U.S. Appl. No. 16/799,600, "Linkage System for Prehending Objects Using Impactive Forces", as filed Feb. 24, 2020.

(Continued)

*Primary Examiner* — Stephen A Vu
(74) *Attorney, Agent, or Firm* — Eversheds Sutherland (US) LLP

(57) ABSTRACT

Aspects described herein include an end effector having an interface system that includes a body member attached to a mounting plate, and a plurality of strength-varying features at a plurality of regions of the interface system. The plurality of strength-varying features encourage the body member to repeatably deform into a deformed configuration. The end effector further comprises a vacuum port in fluid communication with an inner recess of the body member, and a plurality of actuators that apply a force to the mounting plate to pivot a portion of the mounting plate and deform the body member into the deformed configuration.

20 Claims, 13 Drawing Sheets

(56) References Cited

U.S. PATENT DOCUMENTS

| | | | |
|---|---|---|---|
| 6,846,029 B1 * | 1/2005 | Ragner | B25B 9/00 |
| | | | 294/219 |
| 8,251,415 B2 | 8/2012 | Lomerson, Jr. | |
| 8,525,955 B2 | 9/2013 | Long | |
| 9,457,477 B1 * | 10/2016 | Rublee | B25J 15/0023 |
| 10,357,883 B1 * | 7/2019 | O'Connor | B25J 15/0616 |
| 10,625,428 B2 | 4/2020 | Coleman et al. | |
| 10,639,790 B1 | 5/2020 | Bacon et al. | |
| 10,913,165 B1 | 2/2021 | Jonas et al. | |
| 10,926,403 B1 | 2/2021 | Asokan et al. | |
| 11,077,564 B1 | 8/2021 | Polido et al. | |
| 11,084,175 B2 | 8/2021 | Polido et al. | |
| 2006/0043747 A1 | 3/2006 | Kniss | |
| 2008/0187428 A1 | 8/2008 | Murry | |
| 2009/0320417 A1 | 12/2009 | Gilmore | |
| 2012/0207574 A1 | 8/2012 | La Rovere et al. | |
| 2013/0106127 A1 * | 5/2013 | Lipson | B25J 15/0023 |
| | | | 294/189 |
| 2014/0037413 A1 | 2/2014 | Takashima et al. | |
| 2015/0375401 A1 | 12/2015 | Dunkmann et al. | |
| 2016/0096277 A1 | 4/2016 | Noriyuki et al. | |
| 2016/0214812 A1 | 7/2016 | Johnson | |
| 2017/0291307 A1 | 10/2017 | Davi et al. | |
| 2019/0084012 A1 | 3/2019 | McCoy, Jr. et al. | |
| 2019/0389081 A1 | 12/2019 | Coleman et al. | |
| 2020/0122317 A1 | 4/2020 | Zaffaroni | |
| 2021/0086372 A1 | 3/2021 | Wellman et al. | |
| 2021/0094766 A1 | 4/2021 | Ikeya et al. | |

FOREIGN PATENT DOCUMENTS

| | | |
|---|---|---|
| DE | 102013208778 A1 | 11/2014 |
| DE | 102015107394 A1 | 11/2016 |
| DE | 102015210316 A1 | 12/2016 |
| DE | 102016115102 A1 | 2/2018 |
| DE | 102016011618 A1 | 3/2018 |

OTHER PUBLICATIONS

German Patent and Trademark Office, Examination Report for Application 112019003240.4, dated Sep. 28, 2021.

German Office Action for Application No. 102020005752.7 dated Jun. 23, 2021.

Great Britain Intellectual Property Office Search Report for Application No. GB2014553.8 dated Mar. 17, 2021.

\* cited by examiner

VARYING STRENGTH INTERFACE SYSTEM FOR ROBOTIC END-EFFECTOR

CROSS-REFERENCE TO RELATED APPLICATIONS

This application is related to U.S. patent application Ser. No. 16/018,748, filed Jun. 26, 2018, and to U.S. patent application Ser. No. 16/799,600, filed Feb. 24, 2020. Each of the aforementioned related patent applications is herein incorporated by reference in its entirety.

BACKGROUND

The present disclosure relates to prehending items using an end effector, and more specifically, to implementations of an end effector having strength-varying features at regions of an interface system of the end effector.

DETAILED DESCRIPTION

While conventional suction-based end effectors may be effective at moving items having relatively large planar surfaces, the ability to move items without suctioning a single planar surface (e.g., an item lacking a planar surface, an item having a planar surface that is inaccessible in a particular orientation of the item relative to the end effector, and so forth) remains a technical challenge. Further, suctioning may be difficult or entirely unsuitable for certain types of items, such as those having porous surfaces (e.g., a wire or woven basket) causing suction force to be lost.

According to embodiments described herein, an end effector comprises an interface system having a mounting plate attached to a body member. The interface system further comprises a plurality of strength-varying features at a plurality of regions of the interface system, which encourage the body member to repeatably deform into a deformed configuration. The end effector further comprises a plurality of actuators operably connected to the mounting plate and each configured to apply a force to the mounting plate so as to pivot a portion of the mounting plate and deform the body member into the deformed configuration.

In some embodiments, the body member has, at a distal end, a sealing surface configured to seal with items brought into proximity with the body member. The body member at least partially defines an inner recess in fluid communication with a vacuum port. In some cases, deforming the body member alters a geometry of the sealing surface, such that the sealing surface is more closely aligned with a geometry of the item to form an improved seal with the item.

Using the various implementations of the end effector enables items with complex and/or irregular shapes to be manipulated at greater velocities and/or accelerations without a loss of suction and/or without damaging the items. For example, altering the geometry of the sealing surface may allow a small item to be selectively picked from among multiple small items. Further, the overall size of the end effector may be such that the end effector is capable of reaching items having a reduced or restricted accessibility. In one example, an item may be located in a corner of a tote, such that the walls of the tote may interfere with the end effector as it approaches the item. In another example, an item may have a difficult orientation, such as a book lying flat on the bottom of a tote where the spine of the book is the target contact region for the end effector.

Figure 1A:
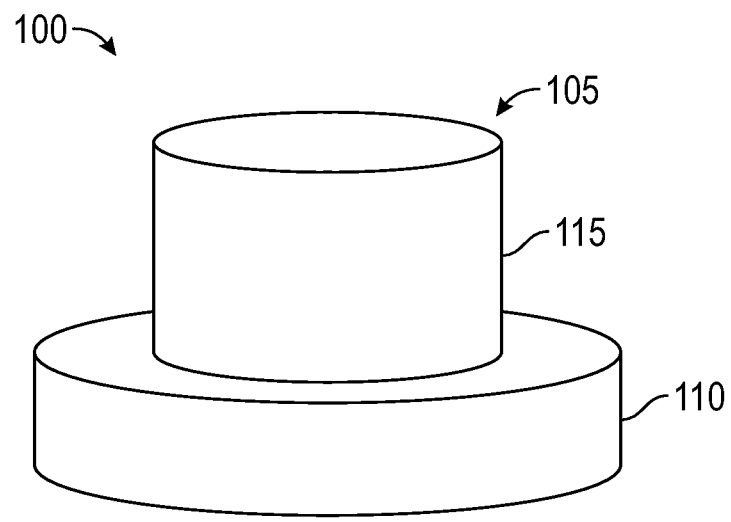
FIGS. 1A and 1B are diagrams of an exemplary end effector, according to various embodiments.
Figure 1B:
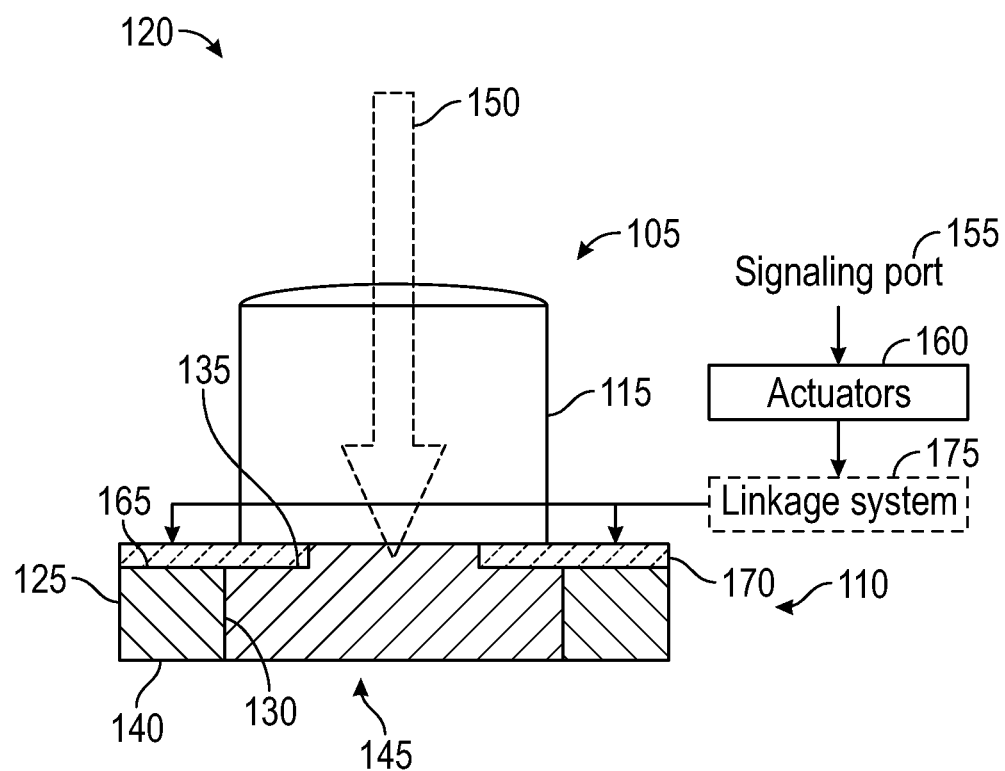

FIGS. 1A, 1B are diagrams 100, 120 of an exemplary end effector 105, according to various embodiments. More specifically, the diagram 100 represents an exterior view of the end effector 105, and the diagram 120 represents a cross-sectional view of the end effector 105. The end effector 105 may be used within an industrial automation system or any alternate environment suitable for prehending and moving items.

The end effector 105 comprises an interface system 110 attached to a manifold 115. The interface system 110 comprises a pliable body member 125 (or "body member") made of any pliable material(s) suitable for forming a seal with a contacting item and maintaining a vacuum. In some embodiments, the pliable body member 125 comprises a suitable closed cell or open cell foam. Some non-limiting examples of pliable materials include natural latex sponge rubber, polymeric foams such as nitrile rubber foam, polyurethane foam, silicone foam, ethylene propylene diene monomer (EPDM) rubber foam, polychloroprene foam (neoprene), and so forth. Other non-limiting examples of pliable materials include elastomeric materials such as latex, rubber, and silicone. In some embodiments, the material of the pliable body member 125 is selected to have a minimum compression set and high tear strength. In some embodiments, the pliable body member 125 has a density range between 200 and 350 kg/cubic meter, although other density values are also contemplated.

The pliable body member 125 comprises an inner surface 130 defining an inner recess 135 (also referred to as a "region", a "central region", or a "vacuum region"). The pliable body member 125 may be monolithic or may comprise a plurality of sections that are dimensioned and arranged in such a manner that a vacuum may be formed and maintained between the pliable body member 125 and the item to be suctioned. The pliable body member 125 may have any suitable shape that defines the inner recess 135, such as an annular disk, a bellows suction cup, and so forth.

Although shown as being a continuous shape, in some cases the pliable body member 125 may define one or more gaps that accommodate the movement of material of the pliable body member 125 during deformation thereof. For example, the gaps may extend radially from a center of the pliable body member 125, and in some cases may be arranged relative to known locations where force is applied to deform the interface system 110. The one or more gaps are dimensioned such that only a minor amount of suction force is lost when the pliable body member 125 is in an undeformed state. Further, the one or more gaps may be partially or fully closed as material from the pliable body member 125 moves during deformation. In some cases, the pliable body member 125 may define one or more perforations that accommodate the movement of material of the pliable body member 125 during deformation thereof.

The pliable body member 125 may be configured to entirely circumscribe the inner recess 135. In some embodiments, when the pliable body member 125 is in an undeformed state, the inner surface 130 and/or the inner recess 135 have elliptical shapes, such as an ellipse or a circle. When viewed from a top view, the manifold 115 and the interface system 110 may have elliptical shapes that are concentric and not coextensive. However, other suitable shapes, sizes, coextensive, and/or non-concentric arrangements of the manifold 115 and the interface system 110 are also possible.

The pliable body member 125 further comprises a sealing surface 140 at a distal end of the pliable body member 125. The distal end of the pliable body member 125, at which items may be contacted and/or suctioned to the end effector 105, may correspond to a distal end of the end effector 105. The sealing surface 140 defines an opening 145 to the inner recess 135. In some embodiments, bringing an item into proximity with the sealing surface 140 causes the sealing surface 140 to conform to a contour of the item and thereby seals the inner recess 135 from ambient. In some cases, bringing the item into proximity with the sealing surface 140 comprises contacting the item to the sealing surface 140. In other cases, bringing the item into proximity with the sealing surface 140 comprises bringing the item close to (although not contacting) the sealing surface 140. As discussed herein, forming a seal with an item (e.g., contacting the item to the sealing surface 140) does not strictly require that all suction force be maintained. It is contemplated that a minor amount of suction force may be lost while the end effector 105 suctions the item, so long as the maintained suction force is sufficiently large to withstand inertial forces that are expected when moving the item.

In some embodiments, the interface system 110 further comprises a mounting plate 170 to which the pliable body member 125 is attached. The mounting plate 170 may have any suitable implementation for pivoting and/or deforming responsive to applied forces. For example, the mounting plate 170 may be formed as a pivotable plate having one or more pivot axes. Some exemplary implementations of the mounting plate 170 are described in U.S. patent application Ser. No. 16/018,748, which is herein incorporated by reference in its entirety.

In some embodiments, the mounting plate 170 pivots and/or deforms to further control a shape and/or sizing of the suction area presented by the end effector 105. In some embodiments, the mounting plate 170 pivots and/or deforms such that the end effector 105 provides impactive forces (e.g., gripping) in addition to the astrictive forces (e.g., suction) provided by the vacuum.

In some embodiments, the mounting plate 170 has a greater rigidity than the pliable body member 125, and may be formed of different material(s) and/or differently dimensioned. For example, the greater rigidity of the mounting plate 170 may allow one or more actuators 160 to, through direct connection with the mounting plate 170 or optionally connected via a linkage system 175, deform the pliable body member 125 without causing substantial wear or damage thereto. In one embodiment, the mounting plate 170 comprises a urethane rubber material, but other types of pliable materials are also possible.

In some embodiments, the mounting plate 170 comprises multiple layers, which may be formed of different materials. For example, an upper layer of the mounting plate 170 may comprise the urethane rubber material providing good tear strength, flex resilience, and fatigue properties. A lower layer of the mounting plate 170 may comprise a fabric diaphragm that is flexible and non-air porous to maintain the suction force. Some non-limiting examples of the fabric diaphragm include suede, woven fabric, coated fabric, ripstop fiber-reinforced fabric, Cordura, and so forth. In some embodiments, the urethane rubber material and the fabric diaphragm may be co-molded to achieve the fatigue properties and resilience of the urethane with the flexibility and tear resistance of the fabric diaphragm.

In some alternate implementations, the one or more actuators 160 may contact and deform the pliable body member 125 without an intermediate mounting plate 170.

The pliable body member 125 may be attached to the mounting plate 170 using any suitable techniques. In some embodiments, the pliable body member 125 is attached to the mounting plate 170 using one or more of an adhesive layer, a glue, and a fabric. In some embodiments, the pliable body member 125 is attached to a flexible backing plate, and the flexible backing plate is then attached to the mounting plate 170 (e.g., via adhesive layer, glue, and/or fabric).

In some embodiments, the mounting plate 170 defines one or more openings extending therethrough. For example, the mounting plate 170 may define a first opening through which the vacuum port 150 is in fluid communication with the inner recess 135. As shown in the diagram 120, the first opening may be centrally located (e.g., aligned with a central axis of the end effector 105). However, other implementations of the mounting plate 170 (e.g., a different number of openings) are also contemplated.

In some embodiments, the force applied by the one or more actuators 160 (in some cases, via the linkage system 175) to the mounting plate 170 causes the mounting plate 170 to move (for example, to pivot and/or deform). In some embodiments, the applied force deforms the pliable body member 125, which alters a geometry of the sealing surface 140. In some embodiments, the applied force alters a relative orientation of different sealing surfaces 140 of the interface system 110.

The one or more actuators 160 may be of any suitable type(s). For example, the one or more actuators 160 may be actuatable according to any suitable means, such as pneumatic, hydraulic, mechanical, motorized, and so forth. Further, the one or more actuators 160 may comprise active and/or passive actuators. Some non-limiting examples of the one or more actuators 160 include linear actuators and rotary actuators. In one embodiment, the one or more actuators 160 comprise one or more linear actuators attached to the interface system 110, and deforming the interface system 110 comprises increasing a length of the one or more linear actuators.

In some embodiments, the pliable body member 125 in an undeformed state has a surface 165 defined within a plane at a proximal end opposite the distal end. Stated another way, a proximal surface of the pliable body member 125 may be within a single plane in the undeformed state, regardless of the overall shape or dimensioning of the pliable body member 125. Conventional implementations of the pliable body member 125 (e.g., a foam suction cup) may be configured to maintain the surface 165 within the plane during operation (e.g., rigidly attached and not permitted to deform), which limits the ability of the foam suction cup to suction to irregular, complex, and/or heavy items. In such a case, the performance of the conventional foam suction cup to prehend items is based solely on the compliance of the foam.

In some embodiments, the one or more actuators 160 may be used to apply force to the pliable body member 125 at the surface 165 via the linkage system 175 and the mounting plate 170. In this way, one or more degrees of freedom are provided to manipulate the pliable body member 125, which permits the pliable body member 125 to be dynamically shaped to more closely match a surface geometry of an item to be suctioned. This increases the compatibility of the pliable body member 125 with different types of items having irregular or complex geometries. This also increases the quality of the seal formed with a suctioned item, allowing heavier items to be moved and/or the items to be moved more rapidly.

The linkage system 175 may have any suitable implementation for transferring forces provided by the one or more actuators 160 to the pliable body member 125. The links of the linkage system 175 are formed of material(s) having suitable strength for transferring the forces from the one or more actuators 160 to deform the mounting plate 170 and the pliable body member 125. For example, the links may be formed of metals such as stainless steel, composite or reinforced plastics, ceramics, and so forth. In some embodiments, the linkage system 175 connects to the interface system 110 at lateral portions of the mounting plate 170.

The linkage system 175 defines a plurality of joints at which the links are connected. In some embodiments, the joints comprise pivots that permit relative rotary motion of connected links. However, a linkage system 175 comprising other type(s) of joints such as sliders are also contemplated. In some embodiments, one or more links of the linkage system 175 are connected with static structural member(s) of the end effector 105 and permitted to rotate relative thereto.

As discussed above, deforming the mounting plate 170 alters a geometry of the sealing surface 140 of the pliable body member 125, which enables an improved seal to be formed with an item. In some embodiments, the links of the linkage system 175 are dimensioned and the joints arranged such that application of force(s) by the one or more actuators 160 cause the pliable body member 125 to deform to an extent that the linkage system 175 provides an impactive force (e.g., gripping) to an item through the pliable body member 125. Thus, the end effector 105 is capable of prehending items using impactive and astrictive (e.g., suction) forces.

In some embodiments, at least one component of the linkage system 175 may be rotatable, which allows the mounting plate 170 and the pliable body member 125 to rotate relative to other components of the end effector 105. In this way, the end effector 105 may be capable of self-aligning with an item, which allows the sealing surface 140 to more closely aligned with the geometry of the item.

The manifold 115 may represent a continuously rigid portion of the end effector 105, and may be used to interface with other components of the industrial automation system. For example, one or more mechanical arms for spatially manipulating the end effector 105 (e.g., displacing and/or rotating) may be attached to the manifold 115. In another example, the manifold 115 may provide points of attachment to the end effector 105, e.g., such as attaching hoses to the vacuum port 150 and the compressed gas port 180 and/or attaching a cable, hose, etc. to the signaling port 155.

The manifold 115 may be formed of any suitable material(s), which may include relatively inelastic material(s) such as plastics or metals. However, in some cases, the manifold 115 may be formed of elastic material(s) and dimensioned to provide a greater rigidity than the pliable body member 125 in the first structural state. In one non-limiting example, the manifold 115 may be formed of a same elastomeric material as the pliable body member 125, but has a much greater thickness than walls of the pliable body member 125. In some cases, the manifold 115 formed of elastic material(s) may be deformable or selectively deformable.

The manifold 115 and the interface system 110 may be connected through any suitable means. In some embodiments, the manifold 115 and the interface system 110 are removably connected using threaded fasteners such as screws or bolts. In other embodiments, the manifold 115 and the interface system 110 are integrally formed.

The end effector 105 comprises a plurality of ports. A vacuum port 150 is in fluid communication with the inner recess 135 and is configured to apply suction force to the inner recess 135 (e.g., when sealed by the sealing surface 140). A signaling port 155 is in communication with one or more actuators 160, and control signals communicated via the signaling port 155 cause the one or more actuators 160 to selectively apply a force to, or otherwise cause a compliant interaction with, the interface system 110 via the linkage system 175. Depending on the configuration of the one or more actuators 160 and the linkage system 175, the applied force deforms the interface system 110 according to one or more degrees of freedom.

Figure 2A:
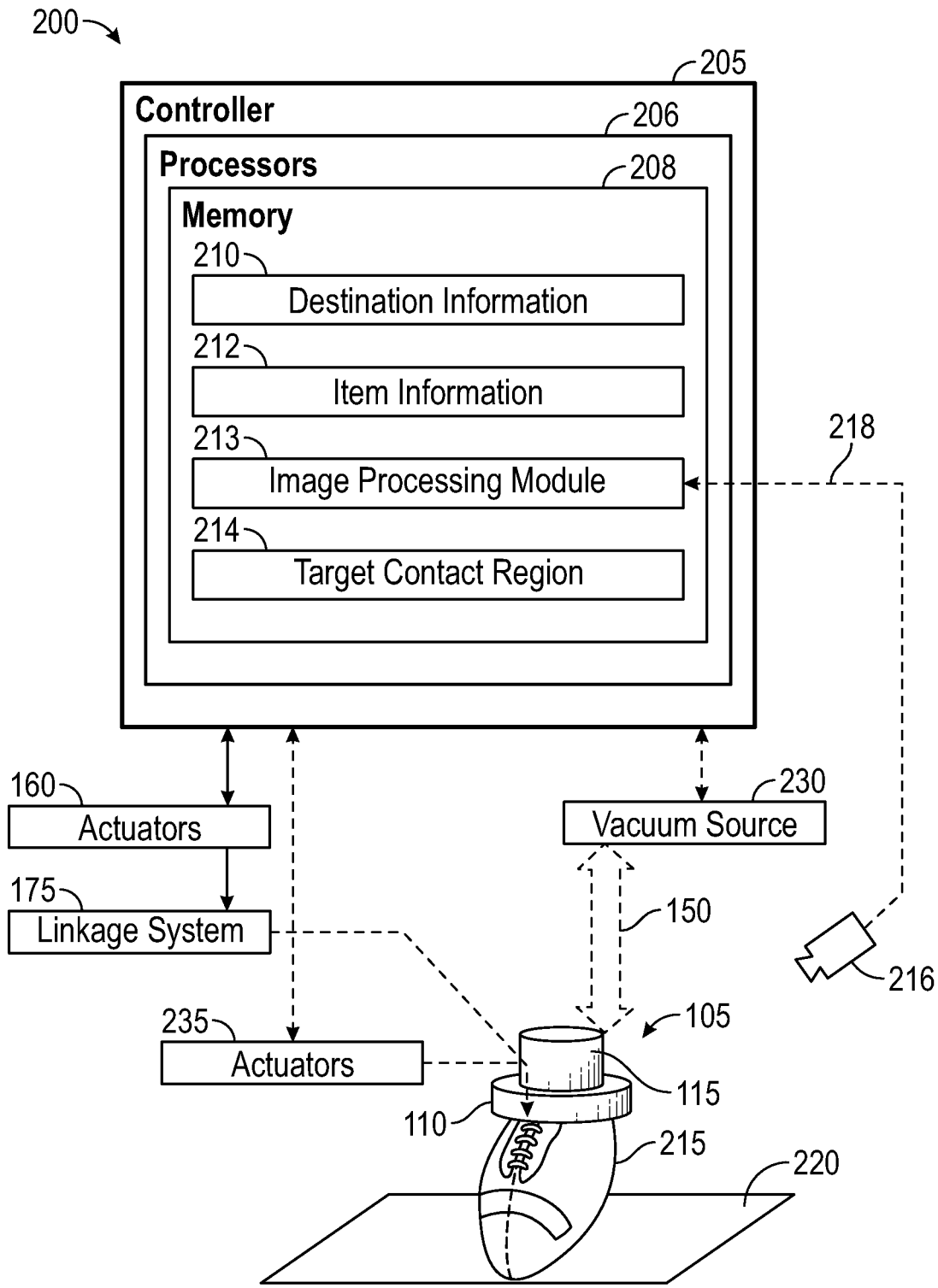
FIGS. 2A and 2B illustrate moving an item using an end effector, according to various embodiments.
Figure 2B:
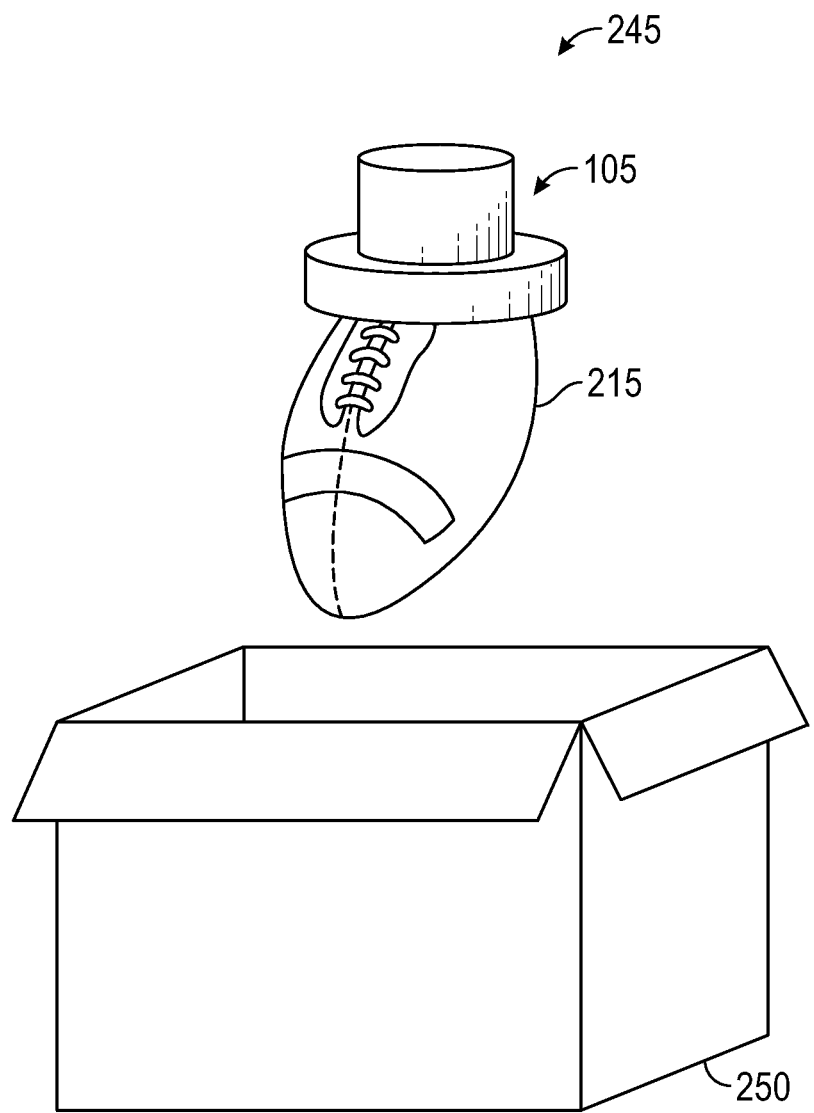

FIGS. 2A, 2B illustrate moving an item using an end effector, according to various embodiments. The features illustrated in diagrams 200, 245 may be used in conjunction with other embodiments, such as the end effector 105 of FIGS. 1A and 1B.

The diagram 200 comprises a controller 205 that is configured to interface with the end effector 105 through at least the vacuum port 150 and the one or more actuators 160 via the signaling port 155. In some embodiments, the controller 205 is further configured to interface with the end effector 105 through one or more actuators 235 connected thereto. The one or more actuators 235 may have any suitable form, and may control the end effector 105 according to one or more degrees of freedom. For example, the one or more actuators 235 may be configured to translate and/or rotate the end effector 105. Some non-limiting examples of the one or more actuators 235 comprise articulating and/or telescoping robotic arms, which may attach to a proximal end of the end effector 105.

The controller 205 comprises one or more computer processors 206 and a memory 208. The one or more computer processors 206 represent any number of processing elements that each can include any number of processing cores. Some non-limiting examples of the one or more computer processors 206 include a microprocessor, a digital signal processor (DSP), an application-specific integrated chip (ASIC), and a field programmable gate array (FPGA), or combinations thereof. The memory 208 may comprise volatile memory elements (such as random access memory), non-volatile memory elements (such as solid-state, magnetic, optical, or Flash-based storage), and combinations thereof. Moreover, the memory 208 may be distributed across different mediums (e.g., network storage or external hard drives).

The memory 208 may comprise a plurality of "modules" for performing various functions described herein. In one embodiment, each module includes program code that is executable by one or more of the computer processors 206. However, other embodiments may include modules that are partially or fully implemented in hardware (i.e., circuitry) or firmware of the controller 205. As shown, the memory 208 comprises an image processing module 213 configured to perform image processing on imagery 218 received from one or more visual sensors 216 in the environment. The imagery 218 may have any suitable form, such as one or more still images or video.

In some embodiments, the image processing module 116 is configured to perform feature extraction and/or image segmentation of the imagery 218, although any other suitable techniques are also contemplated. The image processing performed on the imagery 218 may be used to locate and/or identify the item 215, and/or to determine a positioning and/or orientation of the end effector 105 relative to the item 215. In some embodiments, the memory 208 comprises item information 212 associated with the different items in the environment. Visual characteristics included in the item information 212 may be used by the image processing module 116 to identify the item 215 and/or identify an orientation of the item 215 (e.g., a comparison of the imagery 218 with the item information 212).

In some embodiments, the image processing module 213 is further configured to identify a target contact region 214 of the item 215. The target contact region 214 represents a region of the item 215 that is estimated to provide a relatively good seal with the interface system of the end effector 105. The target contact region 214 may be determined based on a current orientation of the item 215, and may be determined based on the assumption that the item 215 will not be displaced and/or rotated prior to the end effector 105 contacting the item 215. The image processing module 213 may comprise one or more predefined rules for determining the target contact region 214. For example, a first rule may specify that planar surfaces are preferred for the target contact region 214 over rounded surfaces or corners, a second rule may specify that larger surfaces are preferred to smaller surfaces, and a third rule may specify that a corner having a linear (or other elongated) intersection is preferred to a corner having a point intersection. The one or more predefined rules may be based on properties of the end effector 105 (e.g., values or ranges of size, shape, vacuum force, etc.), which may reflect deformation of the interface system by the one or more actuators 160. The one or more predefined rules may also be prioritized relative to each other.

For example, assume that the item 215 has a rectangular shape, with relatively large planar surfaces (e.g., larger than an inner diameter of the inner recess of the end effector 105 in an undeformed state) on two sides, and relatively small planar surfaces (e.g., smaller than the inner diameter) on the other four sides. However, assume further that the large planar surfaces of the item 215 are partially or completely inaccessible by the end effector 105 in a current orientation of the item 215 (e.g., the item 215 is obscured by other items, resting against a surface such as a sidewall or floor, etc.). As it is not feasible to contact only a large planar surface in the current orientation of the item 215, the image processing module 213 may select a "next-best" target contact region, such as an elongated intersection of two sides as specified by the example third rule above.

In conjunction with identifying the target contact region 214, the image processing module 213 may determine a geometry of the target contact region 214. Based on the geometry of the target contact region 214, the controller 205 may send control signals to the one or more actuators 160 to deform the interface system 110 (e.g., pre-shaping the sealing surface at the distal end of the end effector 105). The controller 205 may additionally or alternately send control signals to the one or more actuators 235 to reorient the interface system relative to the item 215 prior to contacting the item 215.

In some embodiments, the controller 205 is configured to transmit control signals to the one or more actuators 235 to provide the end effector 105 with a desired positioning and/or orientation for contacting and/or handling the item 215. In the diagram 200, the end effector 105 has been brought into contact with the item 215 resting on a surface 220. In some alternate embodiments, the end effector 105 and/or the item 215 may be manually moved to provide the contacting relationship, and/or to displace the end effector 105 and the suctioned item 215 to the predefined location. For example, the end effector 105 may include a handle allowing a user to rotate and/or displace the end effector 105.

In some embodiments, the controller 205 is configured to transmit control signals to a vacuum source 230 to selectively apply a vacuum to the inner recess of the end effector 105. The vacuum source 230 may have any suitable implementation, such as a vacuum pump connected to the vacuum port 150 via a flexible hose. Applying the vacuum to the inner recess operates to apply an astrictive force to the item 215, thereby suctioning the item 215 to the end effector 105. In some embodiments, the controller 205 transmits control signals to the one or more actuators 160 to apply an impactive force to the item 215 (e.g., grasping) via the linkage system 175. Applying the impactive force may be independent of applying an astrictive force, or the two may be used in combination. Further, applying the impactive force and the astrictive force may any suitable sequencing. In some embodiments, when the item 215 has been moved to the predefined location, the controller 205 transmits control signals to the one or more actuators 160 and/or the vacuum source 230 to release the grasp and/or the suction on the item 215.

The controller 205 may further transmit control signals to the one or more actuators 235 to displace the end effector 105 and the now-suctioned item 215 to a predefined location, which in some cases may be specified by destination information 210 included in the memory 208 and associated with the item 215. The destination information 210 may have any suitable form, such as a destination within the warehouse (e.g., a particular container 250 or a particular environment location), a destination external to the warehouse (e.g., a portion of a destination mailing address or a particular vehicle for external transport), and so forth. In some embodiments, the controller 205 acquires the destination information 210 from one or more computing devices that are networked with the controller 205.

Figure 3:
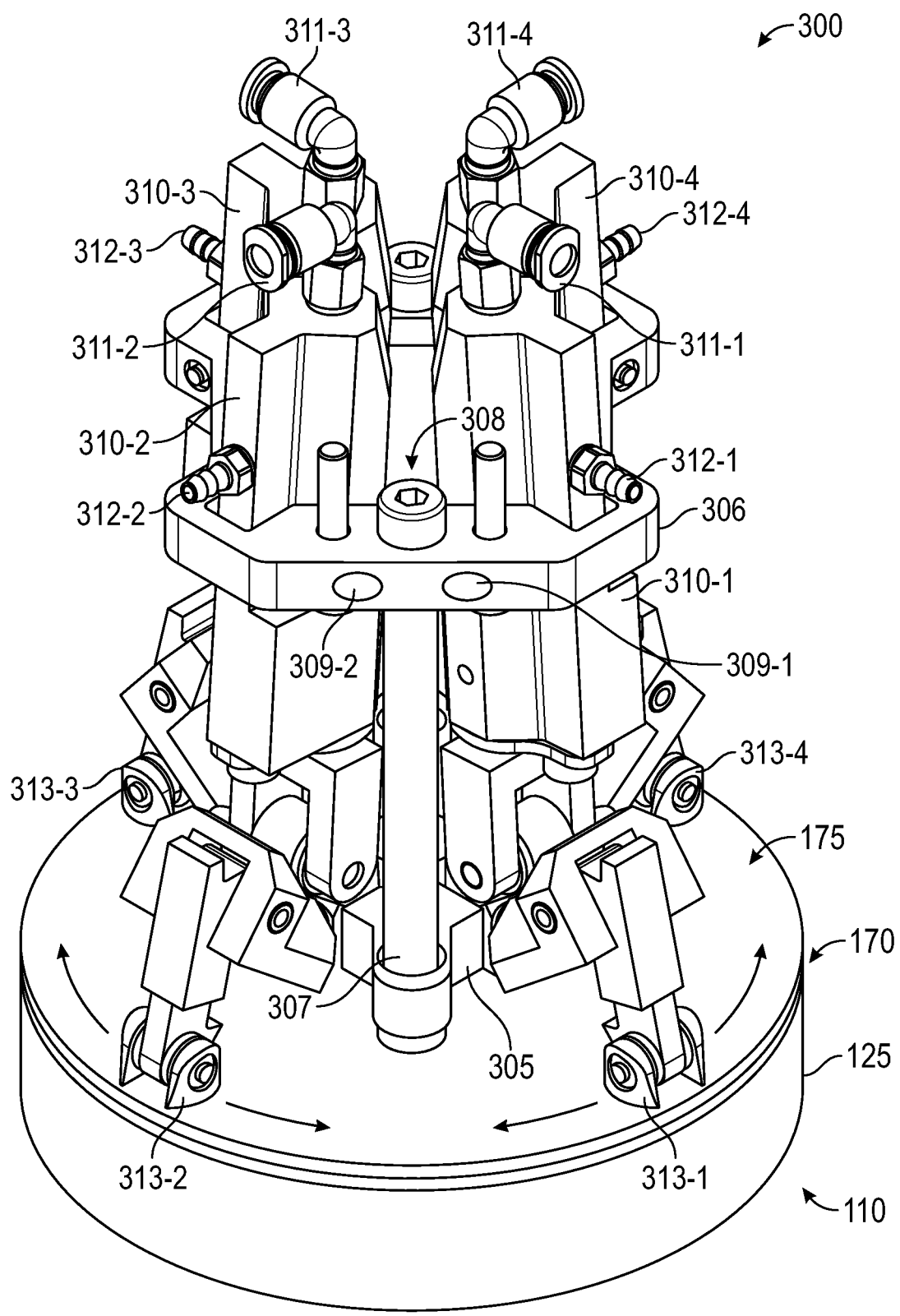
FIG. 3 is an isometric view of an end effector having an exemplary implementation of a linkage system, according to various embodiments.

FIG. 3 is an isometric view of an end effector having an exemplary implementation of the linkage system 175, according to various embodiments. The features illustrated in diagram 300 may be used in conjunction with other embodiments discussed herein. For example, the end effector of the diagram 300 is one exemplary implementation of the end effector 105 of FIGS. 1A and 1B.

In the diagram 300, the end effector comprises the linkage system 175 that connects a plurality of linear actuators 310-1, 310-2, 310-3, 310-4 with the interface system 110. The end effector further comprises a central structural member 305, which connects with the linkage system 175 via at least one joint. In some embodiments, at least one component of the linkage system 175 is rotatable about a rotation axis, which causes the mounting plate 170 to rotate about a central axis of the end effector. In some cases, the rotation of the mounting plate 170 also occurs within the plane of the mounting plate 170.

The end effector further comprises a second central structural member 306 that is spaced apart from, and rigidly connected with, the central structural member 305. A rod 307 extends between lateral portions of the central structural member 305 and of the second central structural member 306. Although not shown in the diagram 300, one or more other rods may extend between the central structural member 305 and of the second central structural member 306. The rod 307 has a longitudinal axis parallel to the central axis. The rod 307 may be secured to the central structural member 305 and to the second central structural member 306 using, e.g., threaded fasteners.

An opening 308 extends through the plane of the second central structural member 306, and is dimensioned and arranged such that each of the linear actuators 310-1, 310-2, 310-3, 310-4 extend through the opening 308. Each of the linear actuators 310-1, 310-2, 310-3, 310-4 may be secured to the second central structural member 306, e.g., using threaded fasteners inserted into openings 309-1, 309-2 that are defined within the plane of the second central structural member 306. In some embodiments, each of the linear actuators 310-1, 310-2, 310-3, 310-4 is rotatable about a rotation axis, e.g., rotatable about respective shanks of the threaded fasteners.

Each of the linear actuators 310-1, 310-2, 310-3, 310-4 connects with the linkage system 175 at a respective first end. The linkage system 175 connects each of the linear actuators 310-1, 310-2, 310-3, 310-4 with the interface system 110 at a respective base 313-1, 313-2, 313-3, 313-4 disposed at a top surface of the mounting plate 170. In some alternate implementations, each of the linear actuators 310-1, 310-2, 310-3, 310-4 connects with a respective base 313-1, 313-2, 313-3, 313-4.

A respective input port 311-1, 311-2, 311-3, 311-4 is arranged at a second end of each of the linear actuators 310-1, 310-2, 310-3, 310-4 that is opposite the first end. Each of the linear actuators 310-1, 310-2, 310-3, 310-4 has a respective exhaust port 312-1, 312-2, 312-3, 312-4 that may limit the travel of the respective linear actuator. For example, compressed gas applied at the input port 311-1 causes the linear actuator 310-1 to extend. Extending the linear actuator 310-1 applies a force through the linkage system 175 to the interface system 110 at the base 313-1. As the linear actuator 310-1 extends beyond a threshold length, the exhaust port 312-1 becomes communicatively coupled with the input port 311-1 and a portion of the compressed gas exits through the exhaust port 312-1, preventing the linear actuator 310-1 from extending further. In some embodiments, the exhaust ports 312-1, 312-2, 312-3, 312-4 may be effectively stopped (e.g., mechanically plugged, a compressed gas applied with a similar pressure to that of the input ports 311-1, 311-2, 311-3, 311-4, and so forth), which allows the linear actuators 310-1, 310-2, 310-3, 310-4 to extend further.

Additional details about the end effector, such as the arrangement of links and joints, the deformed and undeformed states, and alternate implementations are described in U.S. patent application Ser. No. 16/799,600, which is herein incorporated by reference in its entirety.

Figure 4A:
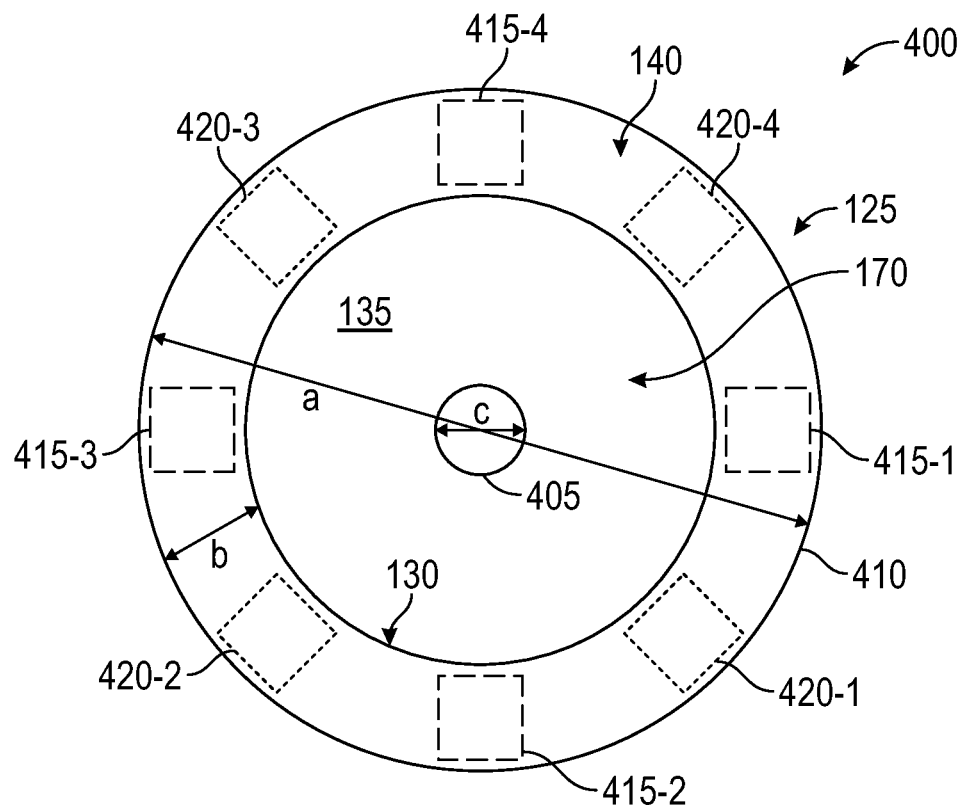
FIGS. 4A and 4B illustrate a plurality of strength-varying features at a plurality of regions of the interface system, according to various embodiments.
Figure 4B:
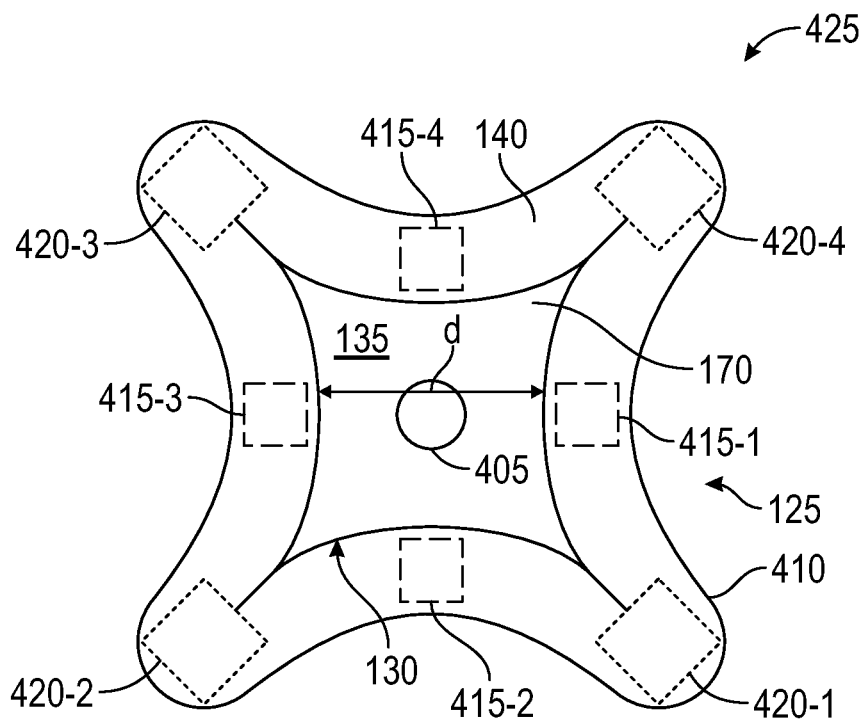

FIGS. 4A and 4B illustrate a plurality of strength-varying features at a plurality of regions of the interface system, according to various embodiments. The plurality of strength-varying features encourage the body member to repeatably deform into a deformed configuration. The features illustrated in diagrams 400, 425 may be used in conjunction with other embodiments discussed herein. For example, the interface system of the diagrams 400, 425 is one exemplary implementation of the interface system 110 of FIGS. 1A and 1B.

The diagrams 400, 425 illustrate a bottom view of the interface system. The sealing surface 140 of the body member 125, as well as a portion of the mounting plate 170 at the inner recess 135 are visible from the bottom view. The diagram 400 illustrates an undeformed configuration of the body member 125, and the diagram 425 illustrates a deformed configuration of the body member 125 (e.g., responsive to force(s) applied to the mounting plate 170 by one or more actuators).

The body member 125 and the mounting plate 170 may have any suitable dimensioning. In one non-limiting example, the body member 125 (defined by an outer surface 410) and the mounting plate 170 each have an outer diameter "a" of about 80 mm, and the body member 125 (defined by the sealing surface 140) has a width "b" of about 12 mm. Using the values of the example, the body member 125 has an inner diameter of about 68 mm. An opening 405 is formed in the mounting plate 170 to enable fluid communication between the inner recess 135 and a vacuum port. In the example, the opening 405 has a diameter "c" of about 10 mm. In other implementations, the body member 125 and/or the mounting plate 170 may have different dimensions, which may or may not have the same proportions as the example.

A first plurality of regions 415-1, 415-2, 415-3, 415-4 (generically, regions 415) and a second plurality of regions 420-1, 420-2, 420-3, 420-4 (generically, regions 420) are defined in the interface system. As shown, the regions 415, 420 are distributed around the body member 125, and overlapping with the body member 125 and lateral portions of the mounting plate 170. In other implementations, some or all of the regions 415, 420 may be partially or fully overlapping with the inner recess 135 and central portions of the mounting plate 170.

In some embodiments, the interface system comprises a plurality of strength-varying features at some or all of the regions 415, 420. The strength-varying features cause the corresponding regions 415, 420 to have a relatively greater or lesser strength than adjacent portions of the interface system. In this way, the strength-varying features encourage the body member 125 to repeatably deform into the deformed configuration.

The strength-varying features may have any suitable implementations. In some embodiments, the strength-varying features are passive features enabled by the structural properties of one or more components of the end effector. In some embodiments, the strength-varying features comprise a reinforcing structure coupled with the mounting plate 170, where the reinforcing structure overlaps the mounting plate 170 at some or all of the plurality of regions 415, 420. The reinforcing structure may be attached to the mounting plate 170 (e.g., via an adhesive) or integrally formed with the mounting plate 170 (e.g., portions of the mounting plate 170 provided with an increased or decreased thickness, with an embedded strengthening material, and so forth). In this way, the plurality of strength-varying features comprise varying stiffness across the mounting plate 170.

In some embodiments, the strength-varying features comprise features included in the body member 125. For example, the strength-varying features may include a plurality of notches defined in the body member 125, e.g., extending into the body member 125 from the inner surface 130 and/or the outer surface 410. In another example, the strength-varying features may include a plurality of openings extending into the body member 125 from the sealing surface 140, which may have a repeating arrangement, may be arranged closer to the inner surface 130 and/or the outer surface 410, and so forth.

As shown, the regions 415-1, 415-3 are arranged along a first dimension on opposing sides of the body member 125, and the regions 415-2, 415-4 are arranged along a second dimension on opposing sides of the body member 125. The first dimension and the second dimension are perpendicular to each other. The regions 420-1, 420-3 are arranged along a third dimension on opposing sides of the body member 125, and the regions 420-2, 420-4 are arranged along a fourth dimension on opposing sides of the body member 125. The third dimension and fourth dimension are perpendicular to each other, and are offset from the first dimension and the second dimension by 45 degrees. Although four regions 415 and four regions 420 are shown, other implementations of the interface system may have different numbers and/or positioning of the regions 415, 420.

In some embodiments, the actuators connect to the interface system at one or more of the regions 415, 420. For example, a first pair of actuators may be connected to the regions 415-1, 415-3 (operable to pivot portions of the mounting plate 170 along the first dimension) and a second pair of actuators may be connected to regions 415-2, 415-4 (operable to pivot portions of the mounting plate 170 along the second dimension). A plurality of strength-varying features may be arranged at the regions 420, such as a reinforcing structure coupled with the mounting plate 170 and/or features included in the body member 125. When the first pair of actuators and the second pair of actuators extend, applying forces to the mounting plate 170, the body member 125 deforms into a deformed configuration, e.g., as shown in the diagram 425. Notably, the different actuators may be extended independently of each other, such that the deformed configuration may correspond to extending only the first pair of actuators, extending only the second pair of actuators, and extending other combinations of the actuators. The strength-varying features at the regions 420 encourage the body member 125 to repeatably deform into the deformed configuration. For example, the reinforcing structure may provide greater strength that encourages the mounting plate 170 to retain its dimensioning along the third dimension (i.e., connecting the regions 420-1, 420-3) and along the fourth dimension (i.e., connecting the regions 420-2, 420-4), and openings and/or notches formed in the body member 125 may provide lesser strength that encourages the body member 125 to preferentially collapse or fold at the regions 420.

Continuing the example, the inner recess 135 may have a diameter "d" of about 25-35 mm in the deformed configuration. With the reduced size of the inner recess 135 in the deformed configuration, the interface system may have greater selectivity, e.g., allowing a small item to be selectively picked from among multiple small items, and/or may be capable of forming an improved seal with an item.

Figure 5A:
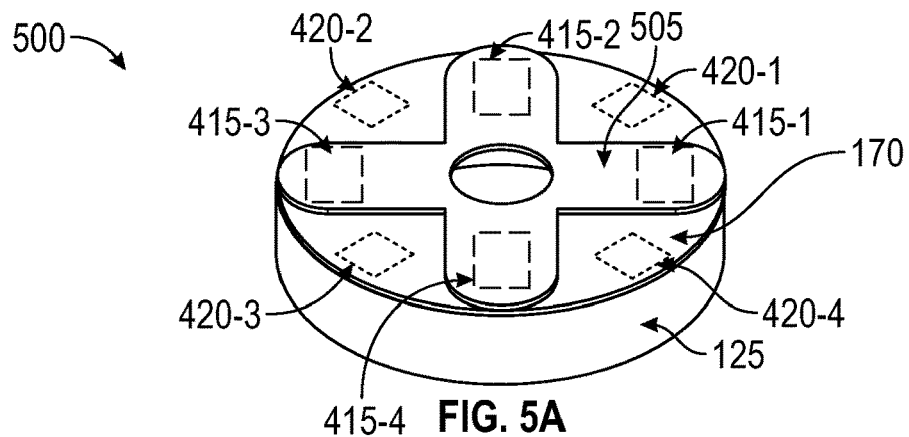
FIGS. 5A and 5B are diagrams providing views of an interface system comprising a plurality of strength-varying features, according to various embodiments.
Figure 5B:
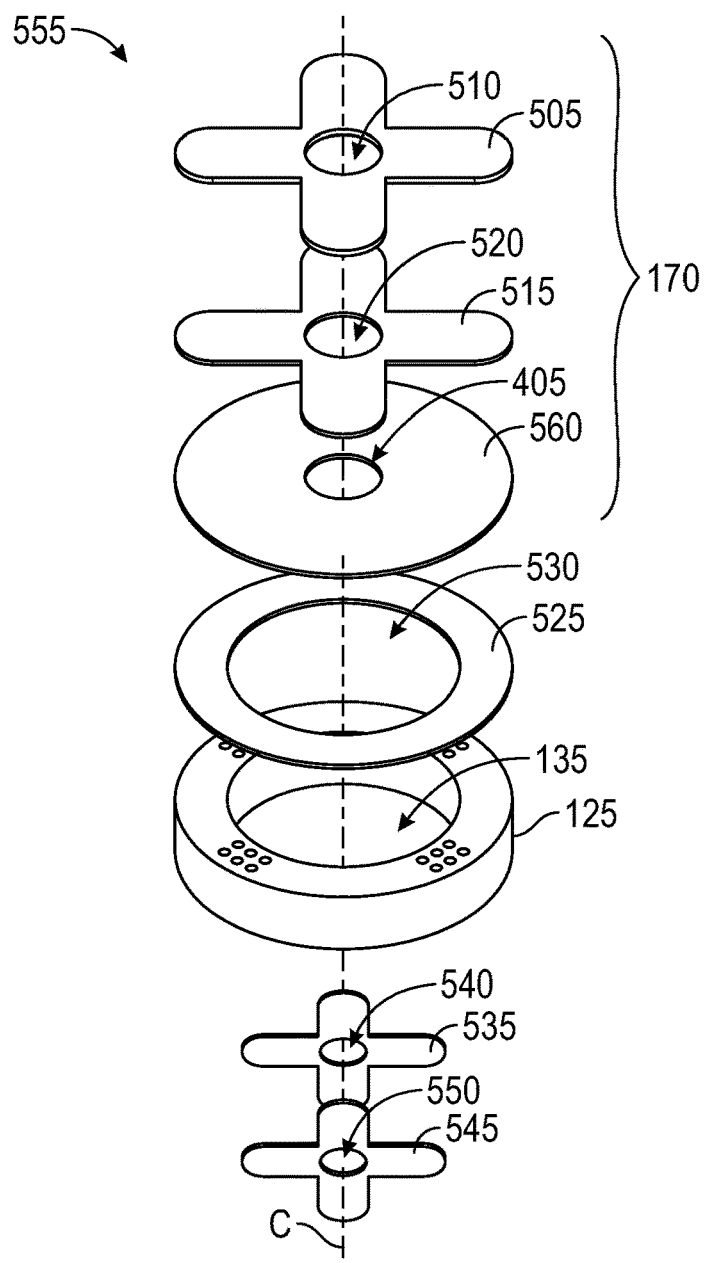

FIGS. 5A and 5B are diagrams 500, 555 providing views of an interface system comprising a plurality of strength-varying features, according to various embodiments. More specifically, the diagram 500 provides a perspective view and the diagram provides an exploded view of the interface system. The features illustrated in the diagrams 500, 555 may be used in conjunction with other embodiments discussed herein. For example, the interface system is one exemplary implementation of the interface system 110 of FIGS. 1A and 1B that includes multiple types of strength-varying features.

Figure 8:
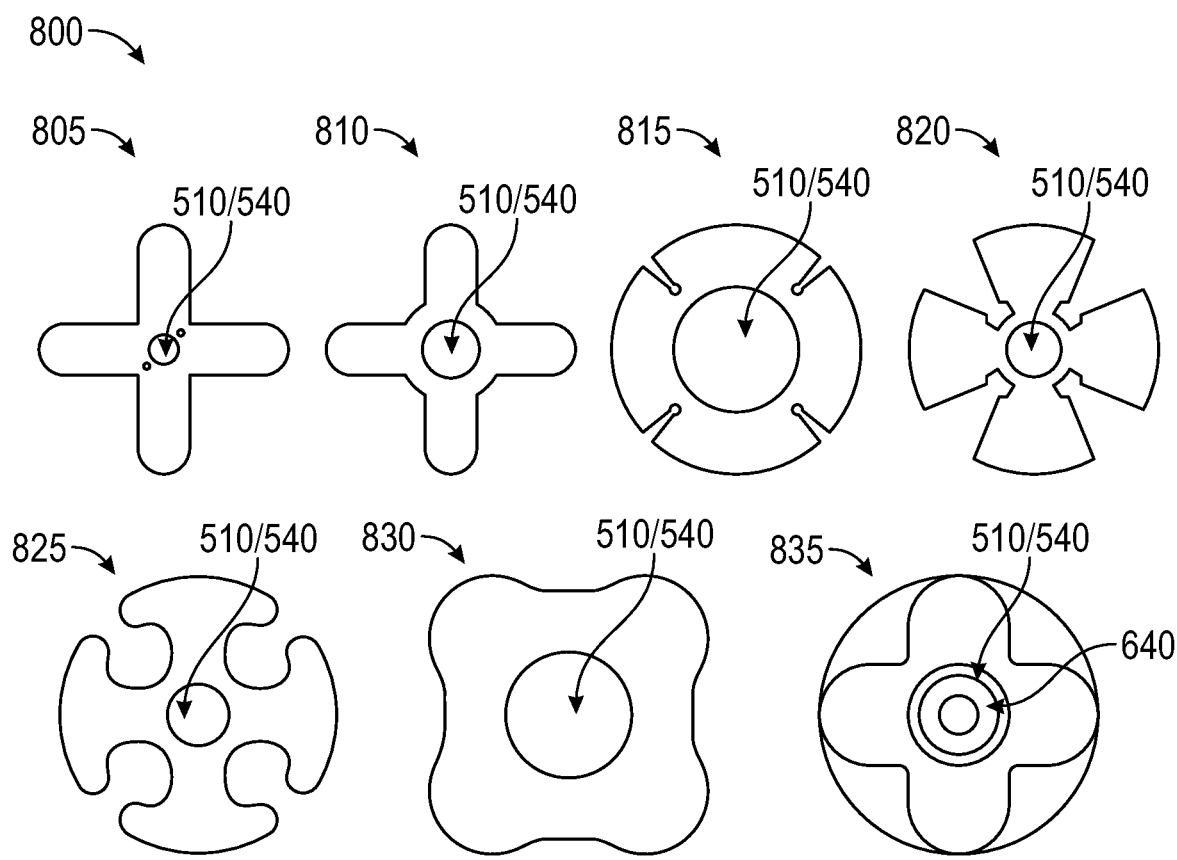
FIG. 8 is a diagram illustrating exemplary implementations of strength-varying features in a reinforcing structure, according to various embodiments.

The mounting plate 170 of the interface system comprises a diaphragm 560 and a reinforcing structure 505 providing a first type of strength-varying features. In some embodiments, the diaphragm 560 comprises a suede or woven fabric and the reinforcing structure 505 comprises a urethane rubber. In other embodiments, the diaphragm 560 and the reinforcing structure 505 comprise a same material (e.g., urethane rubber). As shown, the reinforcing structure 505 has a cross or "X" shape, and the projecting portions of the reinforcing structure 505 provide greater strength to the corresponding regions 415-1, 415-2, 415-3, 415-4 of the interface system. Other shapes of the reinforcing structure 505 are also possible, and some exemplary implementations are illustrated in FIG. 8 and are described below. In some embodiments, the actuators are operably connected with the mounting plate 170 at the regions 415-1, 415-2, 415-3, 415-4.

The reinforcing structure 505 may be formed of any suitable material providing greater stiffness to the mounting plate 170, e.g., polyurethane. In some embodiments, the thickness of the reinforcing structure 505 provides the greater stiffness to the interface system. The changes in thicknesses may be continuous or discrete (e.g., formed as ribs). In some embodiments, the reinforcing structure 505 may include additive materials (e.g., reinforcing fibers) that provide greater stiffness. Combinations of thicknesses and additive materials are also contemplated for the reinforcing structure 505.

Within the mounting plate 170, an adhesive layer 515 attaches the reinforcing structure 505 to a top surface of the diaphragm 560. In some embodiments, the adhesive layer 515 comprises an adhesive film that is suitable for bonding the materials of the reinforcing structure 505 and the diaphragm 560. One non-limiting example of the adhesive layer 515 is Bemis 3218 manufactured by Bemis Associates Inc. In some embodiments, the adhesive layer 515 is dimensioned to overlap with the reinforcing structure 505, such that the adhesive layer 515 is substantially not visible when the reinforcing structure 505 is attached to diaphragm 560.

An adhesive layer 525 attaches the body member 125 to a bottom surface of the mounting plate 170 (e.g., a bottom surface of the diaphragm 560). In some embodiments, the adhesive layer 525 comprises an adhesive film that is suitable for bonding the materials of the body member 125 and the mounting plate 170. One non-limiting example of the adhesive layer 525 is Bemis 6329 produced by Bemis Associates Inc. In some embodiments, the adhesive layer 525 is dimensioned to overlap with the body member 125, such that the adhesive layer 525 is substantially not visible when the body member 125 is attached to the mounting plate 170.

A plurality of openings extend through the body member 125, distributed around the body member 125 as a plurality of groups of openings, providing a second type of strength-varying features to the corresponding regions 420-1, 420-2, 420-3, 420-4 of the interface system. In some embodiments, the regions 420-1, 420-2, 420-3, 420-4 are offset from regions where the actuators are operably connected with the mounting plate 170.

In some embodiments, the openings of the groups of openings are dimensioned and arranged to cause the body member 125 to operate as an auxetic material that exhibits a negative Poisson's ratio. Stated another way, by including the groups of openings, the body member 125 may contract at the regions 420-1, 420-2, 420-3, 420-4 when the body member 125 is compressed responsive to extending the actuators. In this way, the body member 125 may be able to concentrate under the compressive loading to resist the loading.

An adhesive layer 535 attaches a reinforcing structure 545 to the bottom surface of the mounting plate 170. The reinforcing structure 545 may be similarly configured to the reinforcing structure 505 and provides a third type of strength-varying features to the interface system. As shown, the reinforcing structure 545 has a cross or "X" shape similar to the shape of the reinforcing structure 505. Other shapes of the reinforcing structure 545 are also possible, such as those illustrated in FIG. 8. Further, although the reinforcing structure 545 may have projecting portions that overlap with those of the reinforcing structure 505 (e.g., within the same regions of strength-varying features), the reinforcing structure 545 need not have an identical shape as the reinforcing structure 505. The reinforcing structure 545 and the adhesive layer 535 are dimensioned such that each may be arranged within the inner recess 135.

An opening 510 formed in the reinforcing structure 505, an opening 520 formed in the adhesive layer 515, an opening 530 formed in the adhesive layer 525, an opening 540 formed in the adhesive layer 535, and an opening 550 formed in the reinforcing structure 545 are each aligned with the opening 405 of the mounting plate 170 (e.g., an opening of the diaphragm 560) to support fluid communication of a vacuum source with the inner recess 135. In some embodiments, the openings 405, 510, 520, 530, 540, 550 are aligned along a central axis of the interface system and/or a central axis C of the end effector.

Figure 6A:
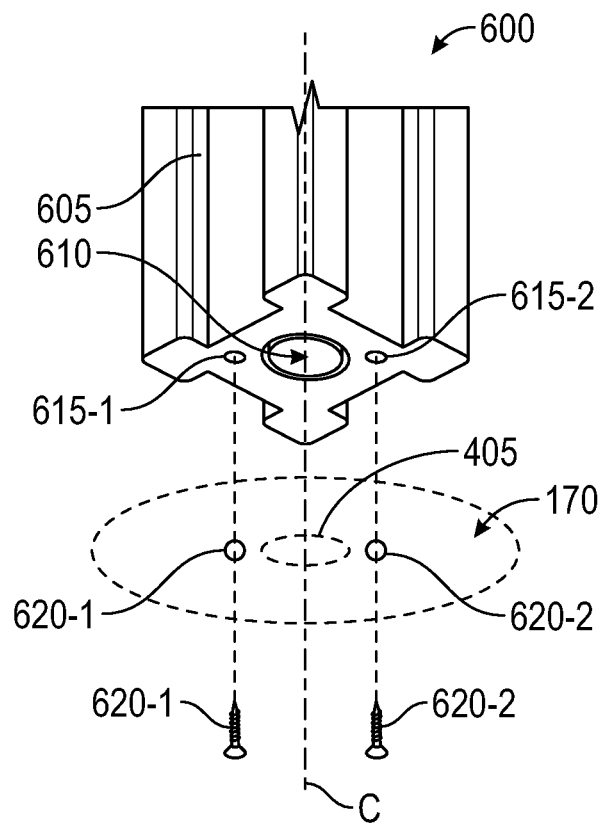
FIGS. 6A-6C are diagrams illustrating implementations of a central structure of an end effector, according to various embodiments.
Figure 6B:
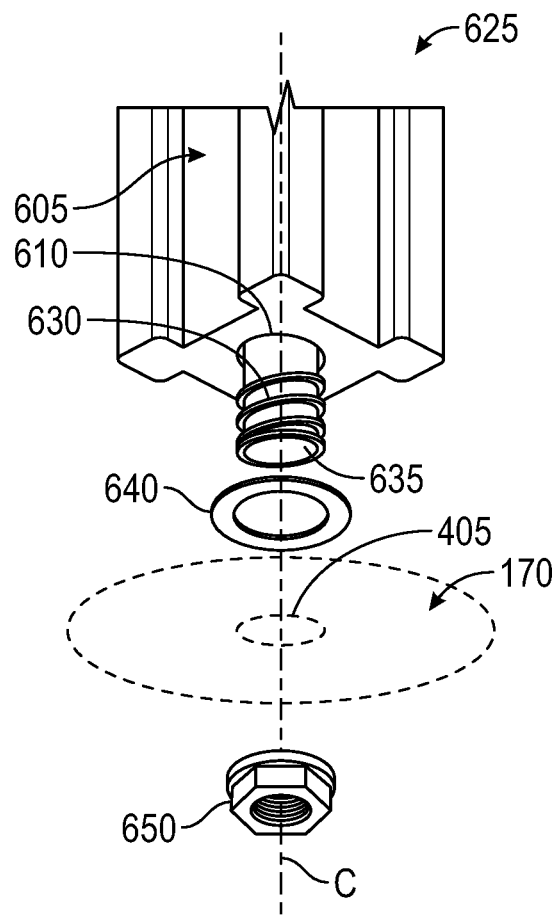
Figure 6C:
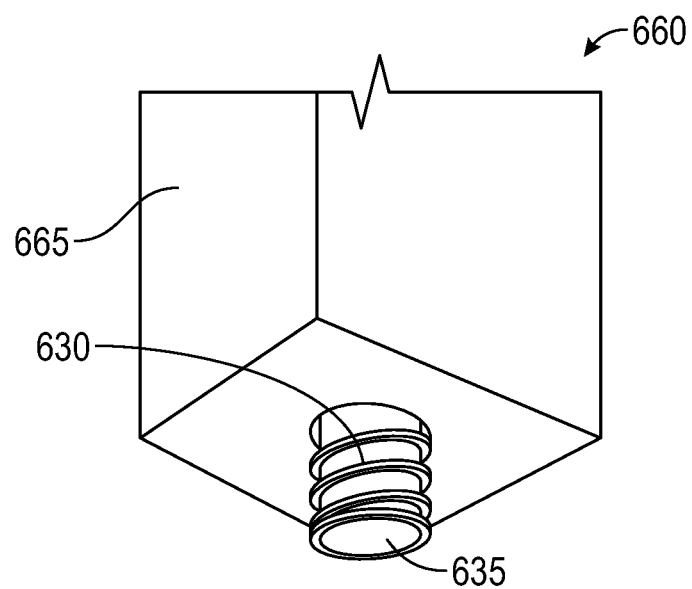

FIGS. 6A-6C are diagrams 600, 625, 660 illustrating implementations of a central structure of an end effector, according to various embodiments. The features illustrated in the diagrams 600, 625, 660 may be used in conjunction with other embodiments discussed herein. For example, the central structure may be used to removably attach an interface system (such as the interface system illustrated in FIGS. 5A and 5B), to support portions of the linkage system 175 of FIG. 3, and so forth.

In the diagram 600, the central structure comprises a structural member 605 having a first opening 610 at a distal surface of the structural member 605. In some embodiments, the first opening 610 is aligned with the central axis C of the end effector. The structural member 605 may be formed of any suitable materials and may have any suitable dimensioning. In one non-limiting example, the structural member 605 is formed of steel. As shown, a long axis of the structural member 605 extends along the central axis C. The distal surface of the structural member 605 is generally rectangular with projecting portions arranged at the vertices. The projecting portions may serve as stop features that limit the travel of the interface system in the proximal direction.

The structural member 605 further defines openings 615-1, 615-2 arranged on opposing sides of the first opening 610 and extending inward from the distal surface. In some embodiments, the openings 615-1, 615-2 are threaded holes dimensioned to receive threaded fasteners 622-1, 622-2 (e.g., screws or bolts). To removably attach the interface system to the structural member 605, the threaded fasteners 622-1, 622-2 are inserted through openings 620-1, 620-2 extending through the mounting plate 170 and engage with the openings 615-1, 615-2.

When the interface system is attached to the structural member 605, the first opening 610 is aligned with the opening 405 of the mounting plate 170. In this way, the vacuum port may be in fluid communication with the inner recess through the first opening 610 and the opening 405.

In the diagram 625, a threaded pipe 630 is partially inserted into the first opening 610 and extends from the structural member 605. In some embodiments, the first opening 610 is a threaded hole and the threaded pipe 630 is a threaded bushing that engages with the threaded hole. The threaded pipe 630 may be attached with the structural member 605 using any suitable means. For example, the threaded pipe 630 may be adhered to the structural member 605 using an epoxy.

In some embodiments, the threaded pipe 630 is dimensioned to extend through the opening 405 of the mounting plate 170, into the inner recess of the interface system. A nut 650 engages with the threaded pipe 630 to removably attach the interface system with the structural member 605. The threaded pipe 630 defines a third opening 635 through which the vacuum port is in fluid communication with the inner recess.

In some embodiments, a washer 640 is attached to the mounting plate 170 around the central axis C. The washer 640 may be formed of any suitable materials and may have any suitable dimensioning for reducing leakage at the interface of the interface system with the structural member 605, thereby reducing a loss of suction and improving a seal formed with an item. Some non-limiting examples of materials for the washer 640 include polyurethane and silicon, which in some cases may be the same material as the mounting plate 170. In some embodiments, a reinforcement structure defines a central opening within which the washer 640 may be arranged, such that the reinforcement structure and the washer 640 are co-planar.

The washer 640 may be attached to the mounting plate 170 using any suitable means. In some embodiments, the washer 640 is attached to a top surface of the mounting plate 170 by an adhesive, by sewing, and so forth. In other embodiments, the washer 640 is attached to a bottom surface of the mounting plate 170 (e.g., arranged within the inner recess) by an adhesive, by sewing, and so forth.

In the diagram 660, the threaded pipe 630 is integrally formed with a structural member 665. The structural member 665 may generally be configured similar to the structural member 605. Although the structural member 665 is shown as having a rectangular profile, in other implementations the structural member 665 may include projecting portions at the vertices.

Figure 7:
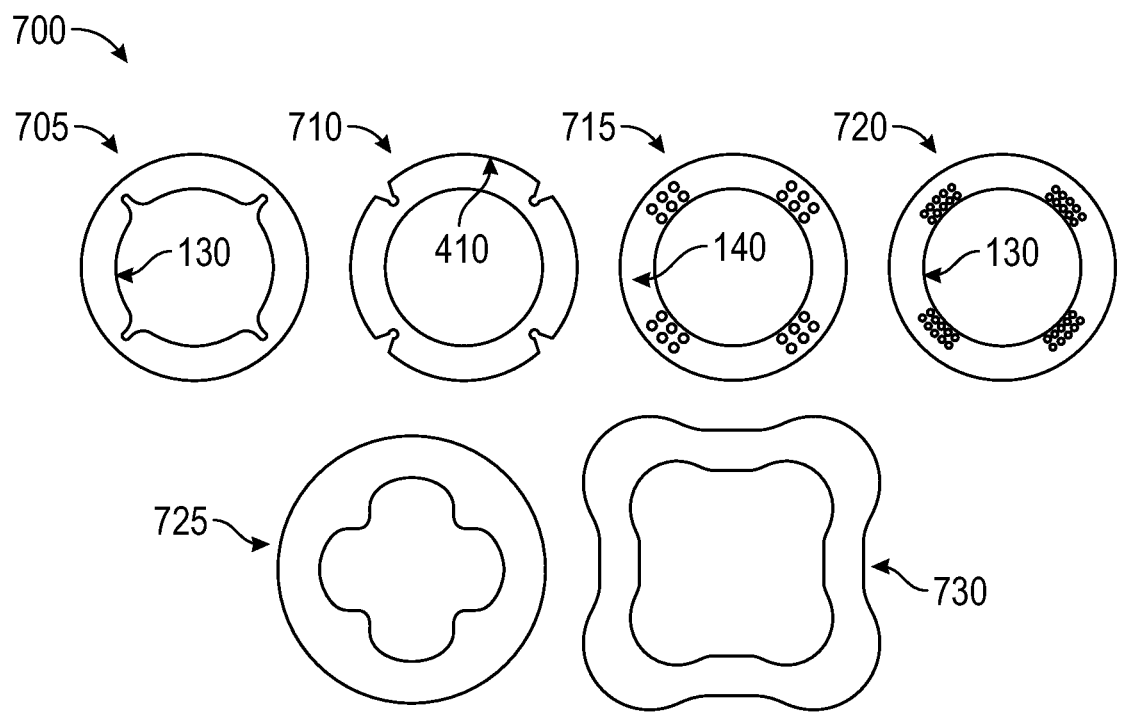
FIG. 7 is a diagram illustrating exemplary implementations of strength-varying features in a body member, according to various embodiments.

FIG. 7 is a diagram 700 illustrating exemplary implementations of strength-varying features in a body member, according to various embodiments. More specifically, the diagram 700 provides a bottom view of body members 705, 710, 715, 720, 725, 730. The features illustrated in the diagram 700 may be used in conjunction with other embodiments discussed herein. For example, the body members 705, 710, 715, 720, 725, 730 may represent exemplary implementations of the body member 125 of FIGS. 1A and 1B that include multiple strength-varying features.

The body member 705 defines a plurality of notches distributed around the inner surface 130 of the body member 705. The body member 710 defines a plurality of notches distributed around the outer surface 410 of the body member 710. Other implementations may include notches in both the inner surface 130 and the outer surface 410. Other implementations may have different shapes of the notches, groups of notches, and so forth.

The body member 715 defines a plurality of openings extending into the body member 715 from a sealing surface 140. More specifically, the body member 715 defines four (4) groups of openings distributed around the body member. As shown, each group of the groups includes six (6) openings arranged in two (2) rows, and the group is approximately centered between the inner surface 130 and the outer surface 410. Other implementations may have different numbers of openings in the groups, different shapes of the openings (e.g., non-circular openings), and/or different arrangements of the openings. For example, the body member 720 defines ten (10) smaller openings in two (2) rows in each group, and the group is arranged closer to the inner surface 130 than to the outer surface 410. As discussed above, the openings of the body members 715, 720 may be dimensioned and arranged to cause the body members 715, 720 to operate as an auxetic material that exhibits a negative Poisson's ratio.

In the body members 725, 730, the strength-varying features are formed by controlling a profile of the respective body members 725, 730, and do not require discontinuities formed in the body members 725, 730 (e.g., forming notches or openings by removing discrete portions of the body members). The body member 725 has a circle-shaped outer surface and a clover-shaped inner surface, such that the body member 725 has a varying width. The body member 730 has a "bread-shaped" outer surface and a bread-shaped inner surface, such that the body member 730 has a substantially constant width. Other implementations of body members are also contemplated (e.g., a bread-shaped outer surface with a circle-shaped inner surface providing a varying width).

Further, although each of the body members 705, 710, 715, 720, 725, 730 is illustrated as having four (4) strength-varying features (e.g., notches, groups of openings, symmetrical inner surfaces and/or outer surfaces), other numbers of strength-varying features are also contemplated. In one example, the body member may include two (2) strength-varying features as a pair arranged along one (1) dimension of the body member. In another example, the body member may include six (6) strength-varying features as pairs arranged along three (3) dimensions of the body member (e.g., each dimension offset by 120 degrees).

In some cases, the body member may include one or more strength-varying features that are not paired along a dimension of the body member. In one example, the body member includes two (2) strength-varying features as a pair arranged along one (1) dimension of the body member, and one strength-varying feature offset from the dimension. In another example, the body member includes an odd number (e.g., three (3), five (5), seven (7)) of strength-varying features distributed around the body member, such that no pairs are formed along any dimension of the body member.

FIG. 8 is a diagram 800 illustrating exemplary implementations of strength-varying features in a reinforcing structure, according to various embodiments. More specifically, the diagram 800 provides a top view of reinforcing structures 805, 810, 815, 820, 825, 830, 835. The features illustrated in the diagram 800 may be used in conjunction with other embodiments discussed herein. For example, the reinforcing structures 805, 810, 815, 820, 825, 830, 835 may represent exemplary implementations of the reinforcing structures 505, 545 of FIGS. 5A and 5B.

The reinforcing structure 805 has a cross or "X" shape similar to the reinforcing structures 505, 545. The projecting portions of the reinforcing structure 805 project outward from the respective opening 510, 540. The reinforcing structure 810 also has a cross or "X" shape, and includes a central ring around the respective opening 510, 540 from which the projecting portions project.

The reinforcing structure 815 has a "sawblade" shape defining a wider opening 510, 540. The segments of the sawblade are separated by notches formed into the outer surface of the reinforcing structure 815. The reinforcing structure 820 also has a sawblade shape with a central ring defining a narrower opening 510, 540, and with wider notches between each segment of the sawblade.

The reinforcing structure 825 has a "phone dial" shape, in which the notches separating segments of the reinforcing structure 825 have a narrow "neck" near the outer surface of the reinforcing structure 825, and have a larger, rounded "head" as they extend toward the inner surface.

The reinforcing structure 830 has a bread-shaped outer surface with a circle-shaped inner surface providing a varying width of the reinforcing structure 830. The strength-varying features are formed in the reinforcing structure 830 by controlling a profile of the reinforcing structure 830, and do not require discontinuities formed in the reinforcing structure 830. Other implementations of reinforcing structures are also contemplated (e.g., a same-shaped outer surface and inner surface providing a substantially constant width of the reinforcing structure, different-shaped outer surface and inner surface, and so forth).

The reinforcing structure 835 has a cross or "X" shape in which the opening 510, 540 is sufficiently large to arrange the washer 640, such that the reinforcement structure 835 and the washer 640 are co-planar.

Further, although each of the reinforcing structures 805, 810, 815, 820, 825, 830, 835 is illustrated as having four (4) strength-varying features (e.g., projecting portions, different widths, symmetrical inner surfaces and/or outer surfaces), other numbers of strength-varying features are also contemplated. In one example, the reinforcing structure may include two (2) strength-varying features as a pair arranged along one (1) dimension of the reinforcing structure. In another example, the reinforcing structure may include six (6) strength-varying features as pairs arranged along three (3) dimensions of the reinforcing structure (e.g., each dimension offset by 120 degrees).

In some cases, the reinforcing structure may include one or more strength-varying features that are not paired along a dimension of the body member. In one example, the reinforcing structure includes two (2) strength-varying features as a pair arranged along one (1) dimension of the reinforcing structure, and one strength-varying feature offset from the dimension. In another example, the reinforcing structure includes an odd number (e.g., three (3), five (5), seven (7)) of strength-varying features distributed around the reinforcing structure, such that no pairs are formed along any dimension of the reinforcing structure.

Figure 9:
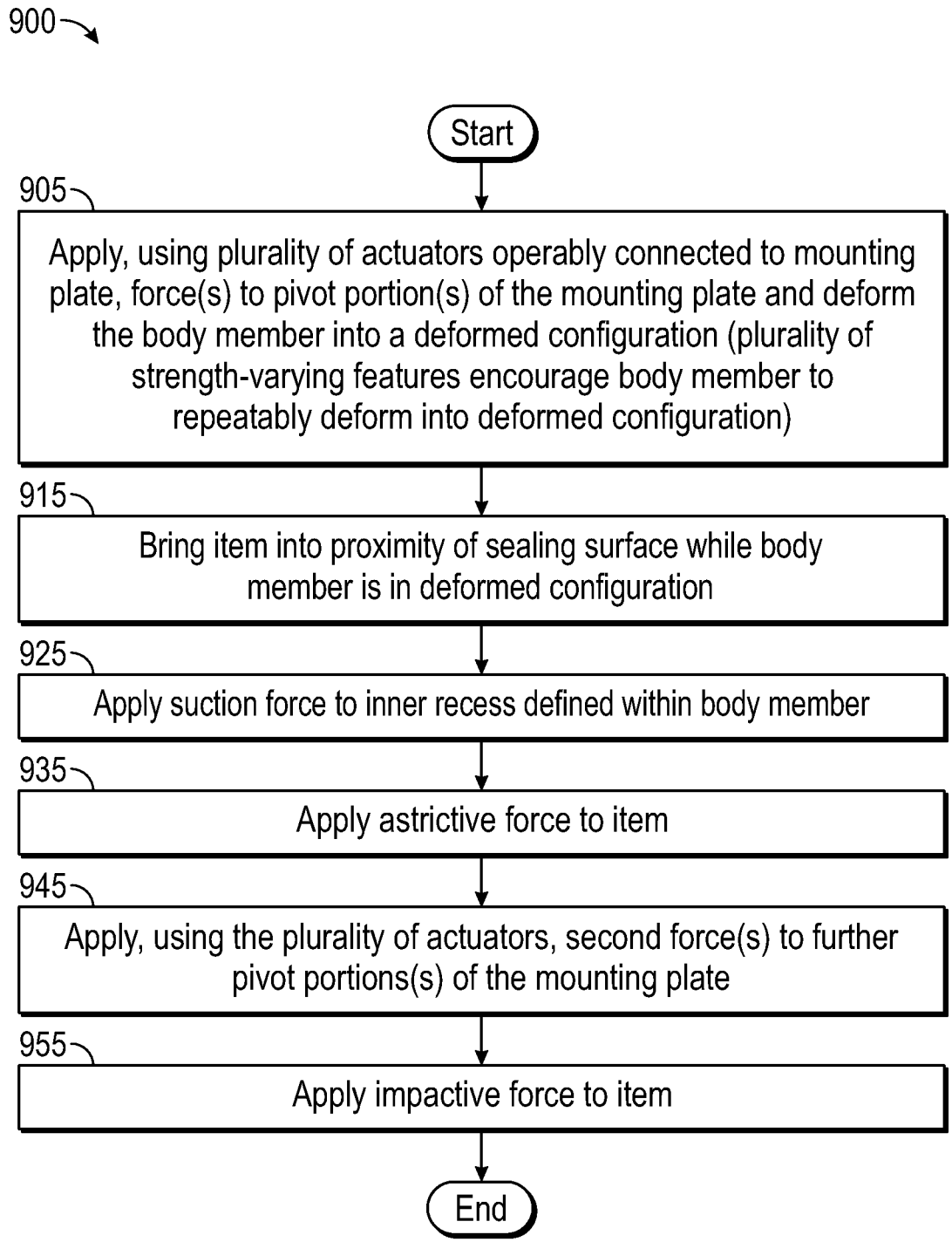
FIG. 9 is a method of prehending an item using an end effector, according to various embodiments.
Figure 10A:
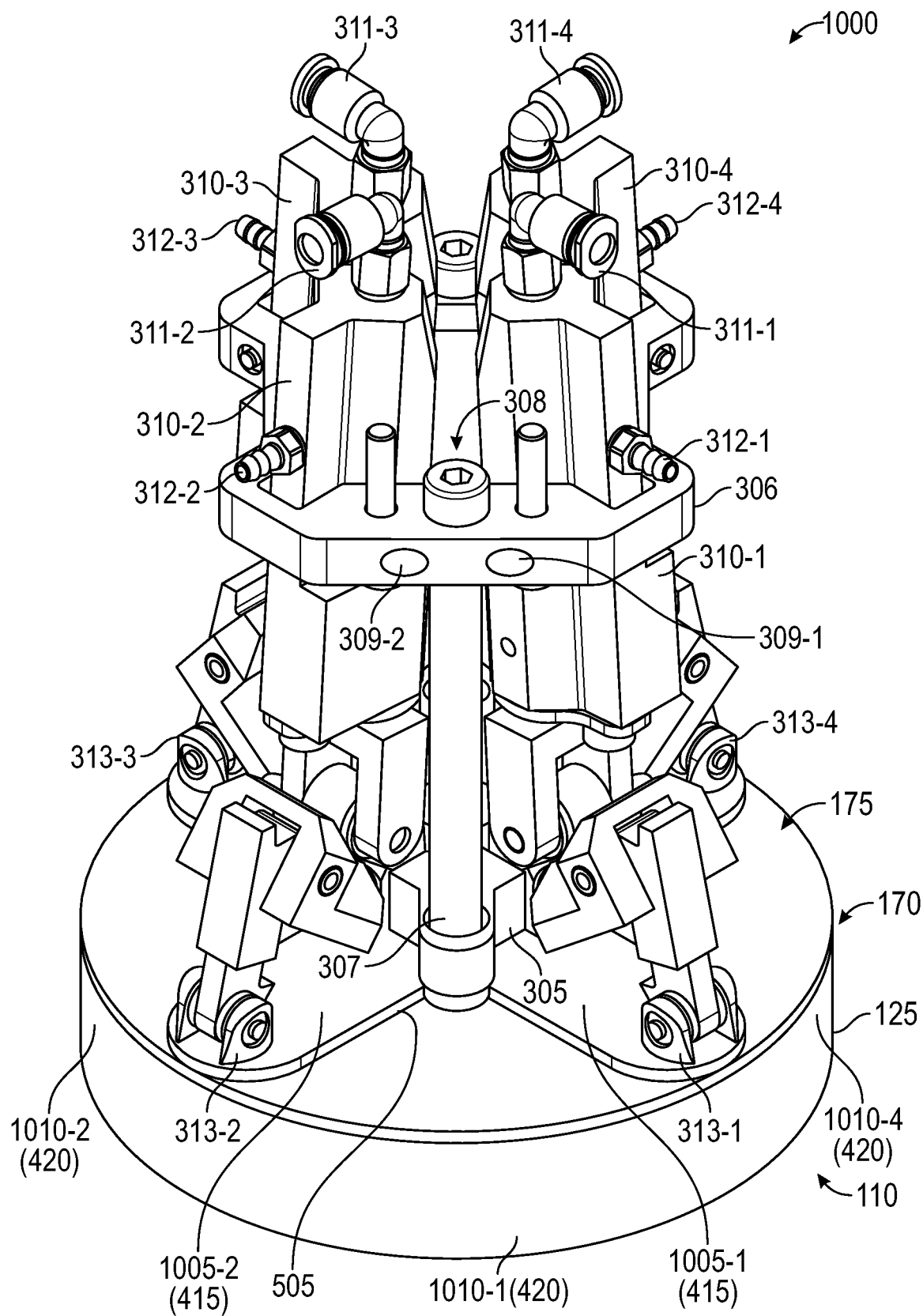
FIGS. 10A-10D are diagrams illustrating an exemplary sequence of picking an item, according to various embodiments.
Figure 10B:
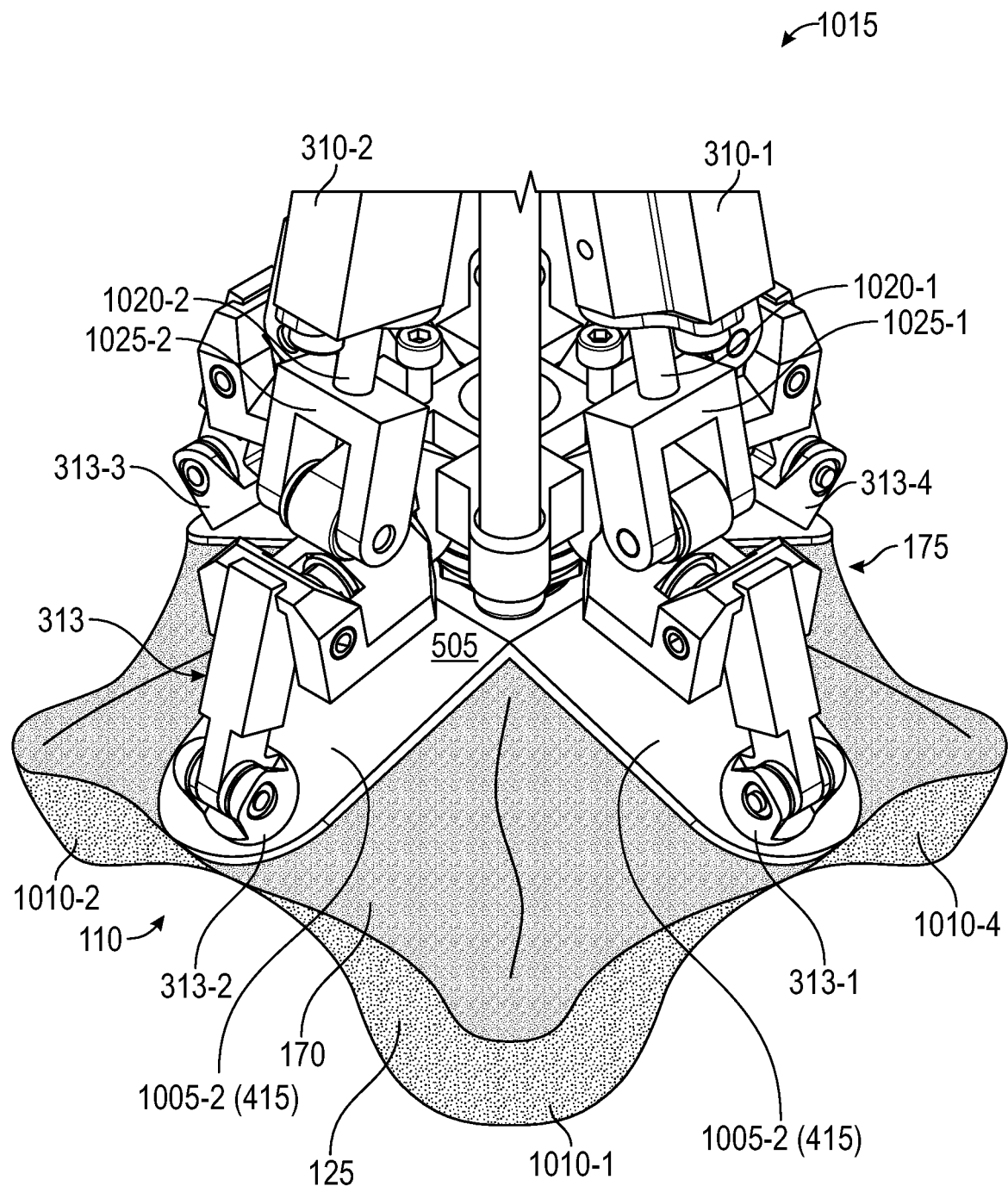
Figure 10C:
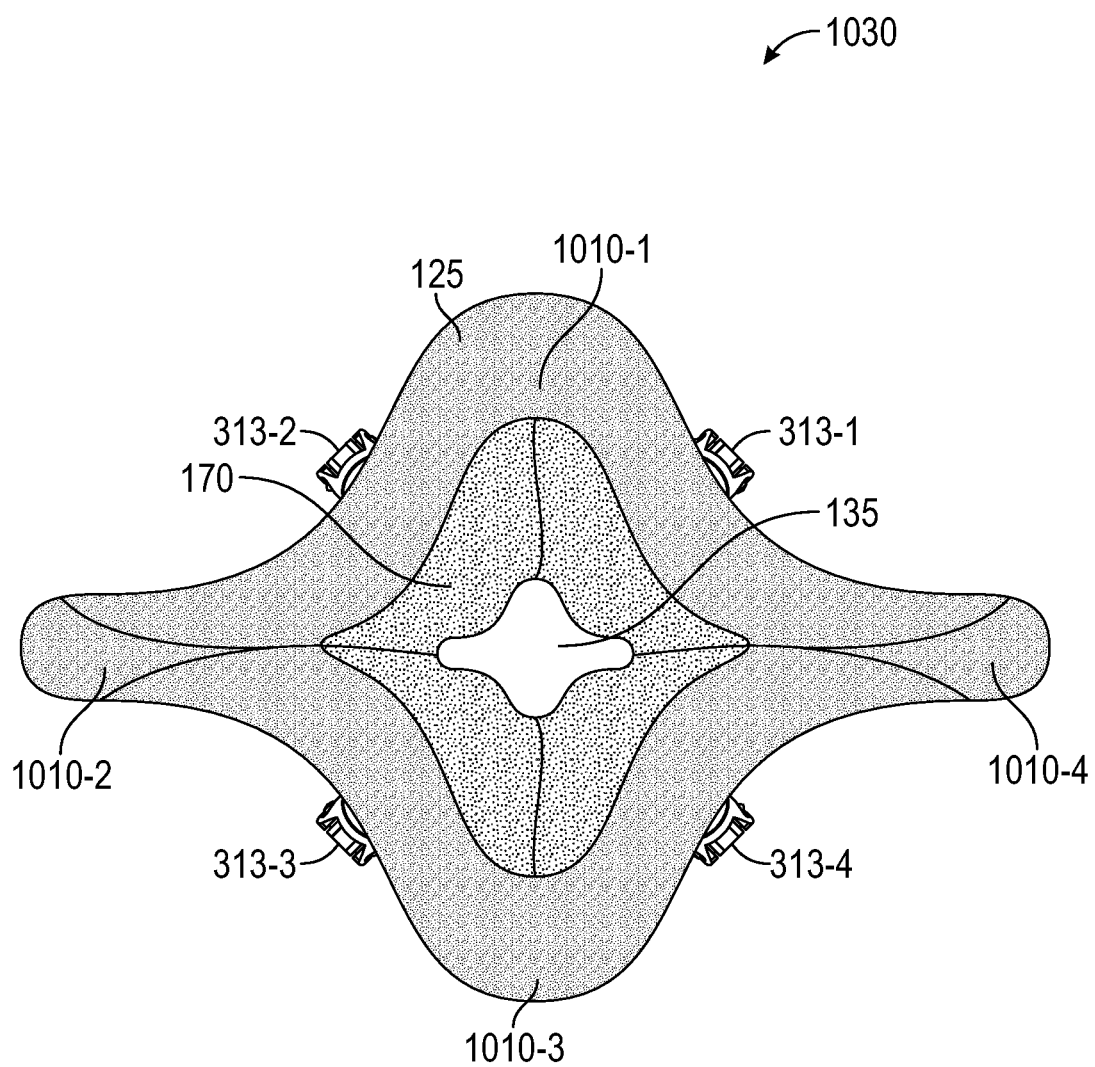
Figure 10D:
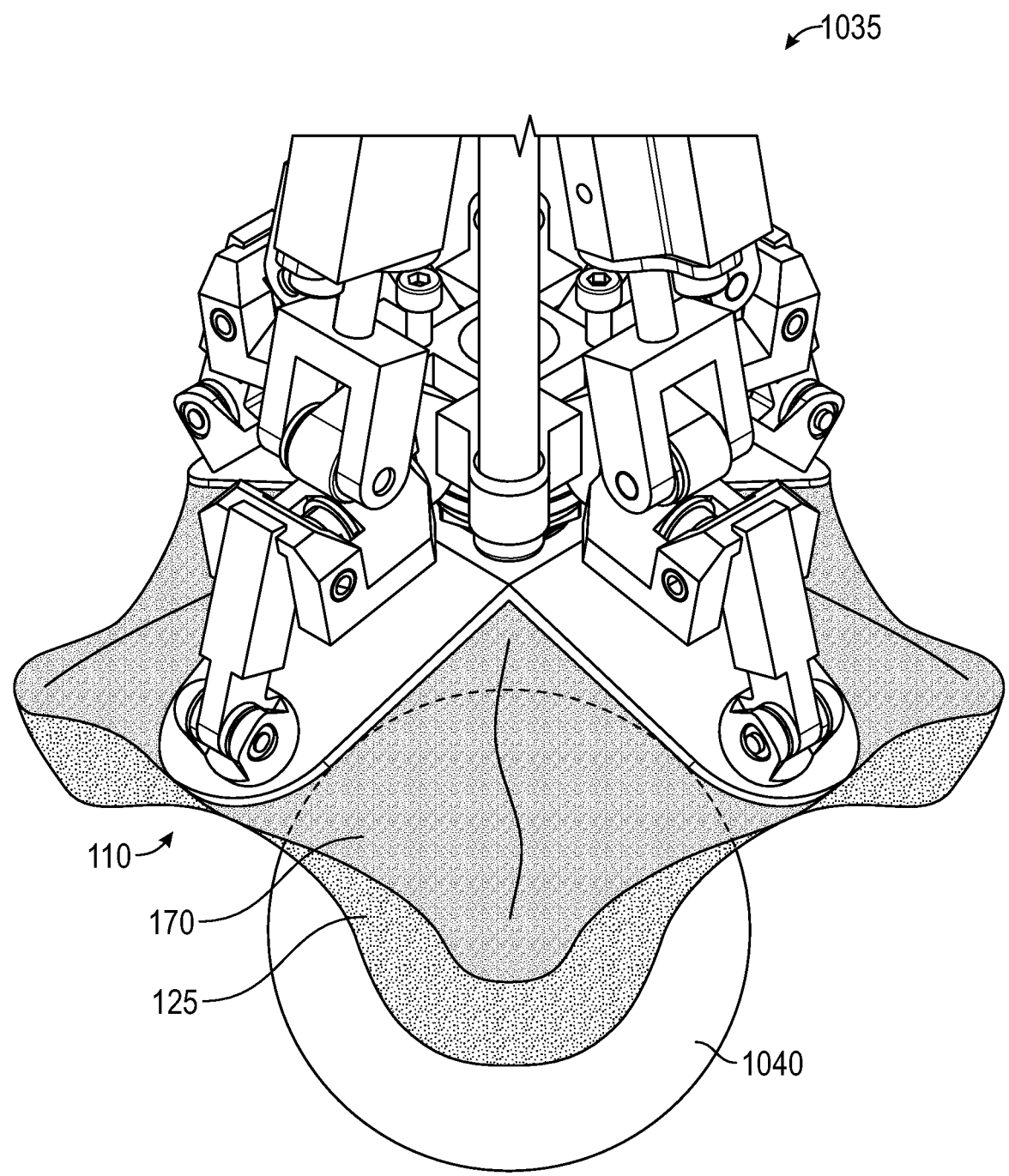

FIG. 9 is a method 900 of prehending an item using an end effector, according to various embodiments. The method 900 may be used in conjunction with other embodiments, such as being performed using an end effector with an interface system having a plurality of strength-varying features.

The method 900 begins at block 905, where one or more forces are applied, using a plurality of actuators operably connected to a mounting plate, to pivot one or more portions of the mounting plate and deform the body member into a deformed configuration. The end effector (and more specifically, the interface system of the end effector) comprises a plurality of strength-varying features that encourage the body member to repeatably deform into the deformed configuration.

At block 915, an item is brought into proximity of a sealing surface while the body member is in the deformed configuration. At block 925, a suction force is applied to an inner recess defined within the body member. In some embodiments, the suction force is applied after contacting the item with the sealing surface. In other embodiments, the suction force is applied prior to contacting the item with the sealing surface, which in some cases may further alter the geometry of the sealing surface. At block 935, an astrictive force is applied to the item.

At block 945, one or more second forces are applied, using the plurality of actuators, to further pivot the one or more portions of the mounting plate. At block 955, an impactive force is applied to the item. The method 900 ends following completion of block 955.

FIGS. 10A-10D are diagrams 1000, 1015, 1030, 1035 illustrating an exemplary sequence of picking an item, according to various embodiments. The features illustrated in the diagrams 1000, 1015, 1030, 1035 may be used in conjunction with other embodiments. For example, the diagrams 1000, 1015, 1030, 1035 depict the interface system 170 of FIGS. 5A and 5B in the end effector of FIG. 3.

In the diagram 1000, the reinforcing structure 505, the mounting plate 170, and the body member 125 are in an undeformed state. The linkage system 175 connects each of the linear actuators 310-1, 310-2, 310-3, 310-4 with the interface system 110 at a respective base 313-1, 313-2, 313-3, 313-4. Each base 313-1, 313-2, 313-3, 313-4 is disposed at a top surface of the reinforcing structure 505. As shown, the base 313-1 is disposed at a projecting portion 1005-1 of the reinforcing structure 505 and the base 313-2 is disposed at a projecting portion 1005-2 of the reinforcing structure 505. The projecting portions 1005-1, 1005-2 are strength-varying features at regions 415. Although not shown in the perspective view of the diagram 1000, one or more openings 1010-1, 1010-2, 1010-3, 1010-4 are formed in the body member 125 at regions 420.

In the diagram 1015, the linear actuators 310-1, 310-2, 310-3, 310-4 are extended, causing the reinforcing structure 505, the mounting plate 170, and the body member 125 to be deformed. More specifically, the linear actuators 310-1, 310-2 respectively comprise rods 1020-1, 1020-2 attached to forks 1025-1, 1025-2. The rods 1020-1, 1020-2 and forks 1025-1, 1025-2 extend in a generally downward direction, causing elements of the linkage system 175 to rotate and apply forces to the reinforcing structure 505. The projecting portions 1005-1, 1005-2 and the one or more openings 1010-1, 1010-2, 1010-3, 1010-4 cause the body member 125 to repeatably deform into the deformed configuration. The diagram 1030 provides a bottom view corresponding to the diagram 1015.

As shown, when the body member 125 is in the deformed configuration, the inner recess 135 has a reduced diameter permitting greater selectivity, which allows smaller items to be selectively picked from among multiple small items. The diagram 1035 illustrates the end effector picking a ping-pong ball 1040 (an example of a relatively small item) while the body member 125 is in the deformed configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An end effector comprising:
   an interface system comprising:
      a mounting plate;
      a body member attached to the mounting plate, the body member having, at a distal end, a sealing surface configured to seal with items brought into proximity with the body member, the body member at least partially defining an inner recess; and
      a plurality of strength-varying features at a plurality of regions of the interface system, the plurality of strength-varying features encouraging the body member to repeatably deform into a deformed configuration;
   a vacuum port in fluid communication with the inner recess; and
   a plurality of actuators operably connected to the mounting plate and each configured to apply a force to the mounting plate so as to pivot a portion of the mounting plate and deform the body member into the deformed configuration.

2. The end effector of claim 1, the interface system further comprising:
   a reinforcing structure coupled with the mounting plate and defining some or all of the plurality of strength-varying features, wherein the reinforcing structure overlaps the mounting plate at some or all of the plurality of regions.

3. The end effector of claim 2,
   wherein the reinforcing structure is integrally formed with the mounting plate, and
   wherein the plurality of strength-varying features comprise varying stiffness across the mounting plate.

4. The end effector of claim 2, wherein the reinforcing structure is attached to the mounting plate.

5. The end effector of claim 1,
   wherein the plurality of strength-varying features comprise a plurality of notches defined in the body member, and wherein the plurality of notches are distributed around one or both of: an inner surface and an outer surface of the body member.

6. The end effector of claim 1,
wherein the plurality of features comprise a plurality of openings extending into the body member from the sealing surface.

7. The end effector of claim 1, further comprising:
a central structure comprising a structural member having a first opening at a central axis of the end effector,
wherein the mounting plate defines a second opening at the central axis, and
wherein the vacuum port is in fluid communication with the inner recess through the first opening and the second opening.

8. The end effector of claim 7,
wherein the central structure further comprises a threaded pipe extending from the structural member through the second opening,
wherein a nut engages with the threaded pipe to removably attach the interface system with the structural member, and
wherein the threaded pipe defines a third opening through which the vacuum port is in fluid communication with the inner recess.

9. The end effector of claim 8, wherein the threaded pipe is integrally formed with the structural member.

10. The end effector of claim 7, further comprising a washer attached to the mounting plate around the central axis.

11. A method of prehending an item using an end effector, the end effector comprising an interface system comprising a body member having a sealing surface at its distal end, the body member attached to a mounting plate, the method comprising:
applying, using a plurality of actuators operably connected to the mounting plate, one or more forces to pivot a portion of the mounting plate and deform the body member into a deformed configuration, wherein the interface system further comprises a plurality of strength-varying features at a plurality of regions of the interface system, the plurality of strength-varying features encouraging the body member to repeatably deform into the deformed configuration;
bringing an item into proximity of the sealing surface while the body member is in the deformed configuration; and
applying a suction force to an inner recess defined within the body member.

12. The method of claim 11, wherein the plurality of actuators comprises linear actuators operably connected with lateral portions of the mounting plate.

13. The method of claim 12, wherein the plurality of actuators are operably connected with the lateral portions of the mounting plate through a linkage system.

14. The method of claim 13, wherein applying the suction force to the inner recess causes the end effector to apply an astrictive force to the item, the method further comprising:
applying, using the plurality of actuators through the linkage system, one or more second forces to further pivot the portion of the mounting plate and cause the end effector to apply an impactive force to the item.

15. An interface system for an end effector, the interface system comprising:
a body member comprising a sealing surface configured to seal with items brought into proximity with the body member;
a plurality of strength-varying features at a plurality of regions of the interface system, the plurality of strength-varying features encouraging the body member to repeatably deform into a deformed configuration; and
a mounting plate attached to a second surface of the body member opposite the sealing surface, the mounting plate defining:
an opening in fluid communication with an inner recess of the body member; and
a plurality of actuator interfaces, wherein forces applied by one or more actuators to one or more of the plurality of actuator interfaces pivot one or more portions of the mounting plate and deform the body member into the deformed configuration.

16. The interface system of claim 15, further comprising:
a reinforcing structure coupled with the mounting plate and defining some or all of the plurality of strength-varying features, wherein the reinforcing structure overlaps the mounting plate at some or all of the plurality of regions.

17. The interface system of claim 16,
wherein the reinforcing structure is integrally formed with the mounting plate, and
wherein the plurality of features comprise varying stiffness across the mounting plate.

18. The interface system of claim 16, wherein the reinforcing structure is attached to the mounting plate.

19. The interface system of claim 15,
wherein the plurality of strength-varying features comprise a plurality of notches defined in the body member, and
wherein the plurality of notches are distributed around one or both of: an inner surface and an outer surface of the body member.

20. The interface system of claim 15,
wherein the plurality of features comprise a plurality of openings extending into the body member from the sealing surface.

* * * * *